US012789657B2

(12) United States Patent
Bregman et al.

(10) Patent No.: US 12,789,657 B2
(45) Date of Patent: Nov. 10, 2026

(54) TECHNIQUES FOR CHARGING ELECTRIC VEHICLES

(71) Applicant: BreatheEV Inc., Chandler, AZ (US)

(72) Inventors: Maxwell Jacob Bregman, Chandler, AZ (US); Anthony Philip Manjooran, Granite Bay, CA (US); Philip Mathew, San Jose, CA (US); Thomas Kurian, Kottayam (IN)

(73) Assignee: BreatheEV Inc., Chandler, AZ (US)

( * ) Notice: Subject to any disclaimer, the term of this patent is extended or adjusted under 35 U.S.C. 154(b) by 141 days.

(21) Appl. No.: 18/790,068

(22) Filed: Jul. 31, 2024

(65) Prior Publication Data

US 2025/0296461 A1 Sep. 25, 2025

Related U.S. Application Data

(60) Provisional application No. 63/567,268, filed on Mar. 19, 2024.

(51) Int. Cl.

*B60L 53/30* (2019.01)
*B60L 53/60* (2019.01)
*B60L 53/68* (2019.01)

(52) U.S. Cl.

CPC ......... *B60L 53/305* (2019.02); *B60L 2250/16* (2013.01); *B60L 2260/58* (2013.01)

(58) Field of Classification Search

CPC ............... B60L 53/305; B60L 2250/16; B60L 2260/58; B60L 53/60; B60L 53/67; B60L 53/66; B60L 53/68

See application file for complete search history.

(56) References Cited

U.S. PATENT DOCUMENTS

| | | | | |
|---|---|---|---|---|
| 9,112,382 B2 * | 8/2015 | Paul | ................. | G06Q 10/06314 |
| 12,117,498 B2 * | 10/2024 | Maeda | ............... | G01R 31/3648 |
| 2012/0133325 A1 * | 5/2012 | Thomas | .............. | H02J 7/00036 320/109 |

(Continued)

FOREIGN PATENT DOCUMENTS

WO WO-2018081321 A1 * 5/2018 ............ B60L 53/305

OTHER PUBLICATIONS

Xu Zhang et al., Mobile Charging as a Service: A Reservation-Based Approach, Oct. 2020, IEEE, pp. 1976-1988.*

*Primary Examiner* — Manglesh M Patel

(74) *Attorney, Agent, or Firm* — SCHWEGMAN LUNDBERG & WOESSNER, P.A.

(57) ABSTRACT

The present disclosure relates to techniques for scheduling electric vehicle (EV) charging sessions using an EV charger scheduling service. A method includes presenting a user interface on a client computing device, which prompts an end-user to select a time slot for using an EV charger. Upon receiving the selected time slot, the scheduling service reserves the EV charger for the end-user. The service then receives a signal indicating that an EV is connected to the charger during the reserved time. In response, the user interface is updated with a control element that, when activated by the end-user, instructs the scheduling service to command the EV charger to initiate power delivery. The method enhances the efficiency of EV charging station utilization and provides end-users with a convenient and controlled charging experience.

20 Claims, 17 Drawing Sheets

(56) References Cited

U.S. PATENT DOCUMENTS

| | | | | |
|---|---|---|---|---|
| 2012/0233077 | A1* | 9/2012 | Tate, Jr. | G06Q 10/20 705/65 |
| 2012/0296678 | A1* | 11/2012 | Boot | G06Q 10/02 705/5 |
| 2013/0110296 | A1* | 5/2013 | Khoo | B60L 53/64 700/286 |
| 2014/0257884 | A1* | 9/2014 | Kyoung | G06Q 10/02 705/5 |
| 2017/0282736 | A1* | 10/2017 | Goei | G01C 21/3469 |
| 2019/0210468 | A1* | 7/2019 | Wittl | H02J 7/00714 |
| 2019/0226860 | A1* | 7/2019 | Fisher | B60L 53/66 |
| 2023/0242000 | A1* | 8/2023 | Sun | B60L 53/68 320/109 |
| 2023/0331110 | A1* | 10/2023 | Sun | G06Q 50/06 |

* cited by examiner

TECHNIQUES FOR CHARGING ELECTRIC VEHICLES

RELATED APPLICATIONS

This application is related to and claims the benefit under Title 35, United States Code, Section 119(e) of the earlier filing date of U.S. Provisional Application No. 63/567,268, filed on Mar. 19, 2024, with the title, "Method and System for Charging Electric Vehicles," the disclosure of which is incorporated herein by reference in its entirety.

TECHNICAL FIELD

The present disclosure generally relates to techniques for managing the charging of electric vehicles (EVs). More particularly, the disclosure pertains to technologies that facilitate the reservation or scheduling of charging time slots at EV charging stations, the management of scheduled EV charging sessions, and the optimization of EV charging processes through various user interfaces and backend systems.

BACKGROUND

Electric vehicle supply equipment (EVSE) supplies electricity to an electric vehicle (EV). Commonly referred to as charging stations, charging docks, or chargers, they are crucial infrastructure that support the increasing adoption of electric vehicles. These charging stations provide a means for EV owners to recharge their vehicles, extending their driving range and promoting sustainable transportation. EV charging stations come in various types, including home chargers, public charging stations, workplace chargers, and fast-charging stations along highways. They are equipped with different levels of charging capabilities, ranging from standard Level 1 chargers that use a standard household outlet, to Level 2 chargers that provide faster charging speeds, and Level 3 chargers, commonly referred to as DC fast chargers, that can rapidly charge an EV in a short amount of time.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
FIG. 1 is a diagram illustrating a multi-family residential building having a number of parking spaces for vehicles, with an example of an electric vehicle (EV) charging station having a single connector positioned to be accessible via two of the several parking spaces, consistent with some embodiments.

Described herein are systems and methods for managing and scheduling the use of electric vehicle (EV) charging stations. More specifically, the present disclosure relates to a network-based EV charging station scheduling service (hereafter, "scheduling service") that facilitates the reservation or scheduling of charging time slots for EV chargers, authenticates end-users, monitors charging sessions, and processes billing for a charging session. In the following description, for purposes of explanation, numerous specific details are set forth to provide a thorough understanding of the various aspects of different embodiments of the present invention. It will be evident, however, to one skilled in the art, that the present invention may be practiced without all of these specific details or with varying combinations of the many details and features presented herein.

EVs are rapidly gaining popularity across the globe as a sustainable alternative to traditional internal combustion engine vehicles. This surge in popularity is driven by a combination of environmental concerns, advancements in EV technology, and supportive government policies aimed at reducing carbon emissions. As the public becomes increasingly aware of the environmental impact of fossil fuels, there is a growing demand for cleaner transportation options that contribute to the reduction of greenhouse gas emissions. EVs, with their zero tailpipe emissions, are seen as a key component in the transition towards a more sustainable and eco-friendly transportation ecosystem.

The market share of EVs is expected to continue its upward trajectory, bolstered by improvements in battery technology that result in longer ranges, faster charging times, and more affordable prices. Additionally, the expansion of charging infrastructure and the introduction of a wider variety of EV models catering to different consumer needs are making EVs more accessible to a broader audience. With governments around the world setting ambitious targets for phasing out the sale of new gasoline and diesel vehicles, it is anticipated that the percentage of EVs on the road will significantly increase in the coming years. This shift towards electrification in the automotive industry is not just a trend but a fundamental change in the way society views and uses personal transportation.

A critical component underpinning the widespread adoption of EVs is the development and availability of a reliable and easily accessible charging infrastructure. The convenience and efficiency of charging are paramount to consumer confidence and the practicality of owning an EV. As the number of EVs on the road increases, the need for a robust network of charging stations becomes more acute, mirroring the essential role that gas stations have played for conventional vehicles. The availability of a variety of charging options, including home chargers, public charging stations, and fast-charging facilities, is essential to address the diverse needs of EV owners and to alleviate concerns about range anxiety. A comprehensive and user-friendly charging infrastructure is not only a cornerstone for current EV owners but also a persuasive factor for potential buyers, making it a linchpin in the transition towards a fully electrified transportation future.

Residents of multi-family residential buildings, such as apartment complexes, condominiums, and townhouses, often face significant challenges in accessing EV charging stations. The absence of EV chargers in these shared environments is primarily due to the substantial costs associated with their installation and maintenance. Property owners, landlords, and homeowner associations must contend with the initial financial outlay for purchasing the charging stations and making necessary electrical upgrades when installing the charging stations. Furthermore, the ongoing expense of providing power for vehicle charging can be a deterrent, especially in rental properties where tenant turnover may lead to an uncertain return on investment.

Accessibility issues compound the problem even when EV chargers are present in these residential settings. A notable concern is the tendency of some EV owners to leave their vehicles connected to the chargers beyond the completion of charging, thus monopolizing a parking space and charging station while denying access to other residents. This behavior results in a suboptimal use of the charging facilities, as it forces residents to either wait for an available charger or to charge their vehicles at inconvenient times, dictated by charger availability rather than the actual need for charging.

The situation is further complicated by the absence of a standardized payment and billing system for EV charger usage in shared residential areas. Without a consistent and fair method to distribute electricity costs among residents, property owners may be hesitant to install charging stations. This lack of infrastructure can serve as a barrier to the adoption of EVs, as potential and current owners grapple with the practicality of charging their vehicles in a communal living situation.

The challenges associated with EV charging infrastructure in multi-family residential buildings are mirrored in various other settings where chargers are installed on private property but made available to the public, such as hotels and short-term rentals, restaurants, and retail stores. In these commercial environments, the reluctance to install EV chargers often stems from the same financial concerns-namely, the difficulty in recouping the costs of installation, maintenance, and electricity supply. For businesses, the decision to invest in EV charging stations involves not only the consideration of direct costs but also the potential to attract and retain customers who are EV owners.

However, even when businesses decide to install EV chargers, they may encounter operational challenges similar to those in residential settings. Ensuring that chargers are accessible when needed and managing the potential friction between customers vying for limited charging spots can be complex. Without a clear system to establish and enforce usage policies, businesses risk customer dissatisfaction and potential conflicts. This can be particularly problematic in hospitality settings like hotels and short-term rentals, where a positive customer experience is paramount.

Moreover, the lack of standardized payment systems can deter businesses from offering EV charging as a service, as it complicates the process of billing customers for the electricity used. The potential for disputes over charger access can also create a less welcoming environment, detracting from the overall customer experience and potentially impacting the business's reputation.

Described herein are methods and systems designed to facilitate the scheduling and management of an EV charging session by enabling the reservation of a time slot—that is, a period or window of time having a set starting time and a set ending time on a particular date or dates—for charging at a specific location, or a specific EV charger at a specific location. An end-user accesses the EV charger scheduling service via a client software application executing on one of a variety of different devices, including in some cases, the EV itself. Consistent with some embodiments, using the client software application, an end-user may first specify or select a location and a desired day or range of days, during which the end-user would like to access an available EV charging station. Then, when presented with a selection of available time slots on a desired day, the end-user may select a time slot from a list of presented time slots for which an EV charger is available at a particular location, and the scheduling service will then automatically assign the end-user to one of several available EV chargers at the location. When automatically assigning the end-user to an EV charger based on a selected time slot, the scheduling service may randomly assign the end-user to an EV charger. Alternatively, the scheduling service may assign the end-user to an EV charger based on characteristics of the EV charging station, such that the "best" EV chargers are prioritized on a first-come, first-served basis. In some instances, where there are several EV charging stations with varying connector types available, the scheduling service may automatically assign the end-user to an EV charging station and connector based on a matching algorithm that takes into consideration characteristics of the EV of the end-user as well as the characteristics of the EV charging stations, and end-user's preferences.

Consistent with some embodiments, the end-user may be presented with a list of time slots for a particular location, and then the scheduling service may present to the end-user a list of EV chargers that are available during the selected time slots. Accordingly, the scheduling service may present the list of EV chargers in an order that is random, based on some EV charger characteristic, or based on a matching score that represents a metric indicating the extent to which each EV charger satisfies one or more rules that require a match between an EV charger characteristic, and an EV characteristic or an end-user preference. Accordingly, the selection and presentation of available EV chargers may be based on compatibility between the characteristics of the user's EV and the features of available charging stations.

During the reserved time slot, the assigned EV charger is under the control of the end-user, who can manage the behavior and functionality of the EV charger via a user interface. The user interface may be facilitated via a software application executing on a mobile phone, or via a web-based application accessible on any computing device, including in some cases the infotainment console or a display integrated into the EV itself. The software application communicates with a network-based scheduling service, allowing the end-user to start and stop the charging session using various user interface (UI) control elements during the scheduled time slot.

In other instances, the user interface via which the user controls the EV charger may be facilitated through alternative methods that enhance accessibility and convenience. In some embodiments, the user may control the charger by presenting a device such as a radio frequency identification device (RFID), which, when scanned by the charger, authenticates the user and initiates the charging session. Similarly, users may send an SMS or text code to a specific address or phone number associated with the scheduling service, which then processes the command to start or stop the charging session based on the user's input. Additionally, a text-based chatbot integrated within the mobile or web application can provide an interactive interface where users can type commands to control the charging process. This chatbot can interpret user commands such as "start charging" or "stop charging" and communicate with the network-based scheduling service to execute these commands. This method allows for a seamless interaction between the user and the charging system, ensuring that commands to manage the charging session can be easily and efficiently executed.

These interfaces collectively ensure that users have multiple methods at their disposal to interact with the charging system, making the process more adaptable to different user preferences and technological capabilities. Each method is designed to integrate smoothly with the overall system architecture, allowing for consistent and reliable control over the charging session, thereby enhancing the user experience and operational efficiency of the EV charging infrastructure.

By way of example, an end-user of the scheduling service uses a client application executing on a client computing device to access the scheduling service and to register with the service by establishing an end-user account (e.g., a unique username and password), and by providing information for a payment source to pay for EV charging. This ensures that the end-user is authenticated and that the billing process for charging services is established upfront. Once registered, the end-user can access a user interface through the software application to view the locations of EV chargers, the characteristics of each available EV charger, along with the available time slots for each EV charger. This allows the end-user to plan and schedule their EV charging session in advance, according to their needs and the availability of the EV charging stations.

After selecting an available time slot for a location, or for a specific EV charger at a specific location, and then upon arriving at the EV charging station at the scheduled time, the end-user physically connects the connector of an EV charging station to the charge port of their EV. This action is detected by the EV charging station and initiates a sequence of automated network communications between the EV charging station and the scheduling service. For example, in response to the EV charging station detecting the connection of the EV via the EV charging port, the EV charging station sends a status update to the scheduling service, confirming that the EV is present and ready to charge.

In response to this status update, the scheduling service determines the specific end-user who has reserved the EV charger, and triggers an update in the user interface of the client application where that specific end-user is logged in. This update to the user interface activates a specific control element within the user interface—often a button or a similar interactive feature. When the end-user selects this control element via the user interface of the application, the client computing device executing the application sends a command back to the scheduling service, which in turn communicates a command or instruction to the EV charger to begin the power delivery process.

Similarly, the end-user has the capability to interact with the user interface of the application to pause or completely stop the charging process. This is achieved through the use of interactive UI elements within the user interface, such as buttons or sliders, which are designed to correspond with the various commands or instructions that control the charging session via the EV charger scheduling service. For instance, if the end-user wishes to temporarily halt the charging process—perhaps to run a quick errand—they can select a "Pause" control element within the user interface. Upon selection, the client computing device communicates a command to the scheduling service, which then instructs the EV charger to suspend power delivery.

The scheduling service is designed to dynamically update or refresh the user interface of the application executing on the client computing device, based on the interactions of the end-user and the real-time status of the charging session. For example, if the end-user decides to terminate their charging session ahead of the scheduled end time, they can press the control element associated with the "Stop" command. This action prompts the scheduling service to send a command, over the network, to the EV charger to cease the delivery of power. Concurrently, a notification is presented to the end-user via the user interface, confirming the termination of the charging session and the commencement of a grace period. Additionally, this early termination triggers the scheduling service to open a new slot for other users, effectively making the charging station available sooner than planned. This feature enhances the efficiency of station utilization, ensuring that the charging infrastructure accommodates as many users as possible.

The grace period is an allotted time frame, configurable by the system administrator of the scheduling service, intended to provide the end-user with sufficient time to physically disconnect the connector from their EV, replace it securely in the holder of the EV charger, and vacate the parking space. This period is designed to ensure that the charging station becomes available for the next user in a timely manner, while also preventing the imposition of any idle fees that may be applicable for occupying the charging space beyond the reserved time slot. The scheduling service's ability to provide real-time updates and notifications enhances the user experience by ensuring that the end-user is well-informed of the status of their charging session and any subsequent actions they need to take.

In addition to the user-initiated termination of a charging session through the application interface, the system is equipped to recognize when an end-user physically disconnects the connector of the EV charging station from the EV's charging port. This physical disconnection is detected by the EV charging station's sensors, which are configured to monitor the connection status in real-time. Upon disconnection, the EV charging station promptly sends a status update over the network to the scheduling service, indicating that the charging session has been suspended due to the disconnection of the EV.

The scheduling service, upon receiving the status update, proceeds to modify the user interface of the client application on the end-user's device to reflect the change in charging status. The interface update may include a visual indication, such as a change in color or icon, to signal that the charging has been halted, Additionally, the application may present a prompt or notification to the end-user, requesting confirmation that the charging session is complete. If the end-user confirms the completion of the session through the application, the scheduling service initiates the grace period, allowing the end-user a designated amount of time to securely stow the connector and vacate the parking space without incurring any idle fees. Furthermore, the system is configured to calculate and apply unutilized time fees if the end-user reserves a charging station but does not utilize the full duration of the reserved time, thereby encouraging more accurate booking durations and enhancing availability for other users. This automated detection and communication process ensures a seamless transition between charging sessions and maintains the efficiency of the charging station's operation for subsequent users.

Accordingly, the scheduling service operates as a central hub in this process, coordinating the interactions between the end-user, via the user interface of the application executing on the client computing device, and the EV charging station. The scheduling service ensures that the charging session commences only during the scheduled time slot and that the end-user is billed accordingly for the duration and electricity consumed during the charging session. This scheduling service and system not only streamlines the charging process for the end-user but also allows for efficient management and utilization of the EV charging station's resources, ensuring that the resources are allocated effectively and for the right person. This targeted approach optimizes the use of infrastructure and enhances user satisfaction by reducing wait times and potential conflicts over charger availability.

The advantages of the EV charger scheduling service are manifold. By enabling end-users to reserve a specific time slot to use an EV charger, the scheduling service enhances the overall user experience, allowing for better time management and reducing the uncertainty and frustration associated with finding an available EV charger. The scheduling capability also mitigates the issue of EV chargers being occupied by vehicles that have already completed charging, thereby improving accessibility for all users. Furthermore, the integrated billing system offers a solution to the problem of cost recuperation for property owners and businesses. By charging end-users for the electricity they use, the system creates a revenue stream that can offset the installation and operational costs of the charging stations. This financial model encourages the adoption of charging infrastructure by providing a clear path to profitability or cost recovery. A variety of other aspects and advantages of the various embodiments of the invention are set forth below in the descriptions of the several figures that follow.

FIG. 1 is a diagram illustrating a multi-family residential building 100 having a number of parking spaces 102-A, 102-B, 102-C, and 102-D for vehicles, with an example of an EV charging station 104 having a single connector and positioned to be accessible via two of the several parking spaces (e.g., 102-B and 102-C), consistent with some examples. In this example, the EV charger 104 is centrally located between parking spaces 102-B and 102-C. The strategic positioning of the EV charging station 104 is such that it is accessible from both parking spaces 102-B and 102-C, thereby maximizing the utility and accessibility of the charging station 104.

The EV charging station 104 is designed with a connecting cable that can reach an EV parked in either of the adjacent parking spaces 102-B or 102-C. This strategic placement of the charging station is beneficial, facilitating an efficient transition between consecutive charging sessions. For instance, an EV owner who has reserved a charging time slot may park their vehicle in parking space 102-B and initiate their charging session. As this session nears its scheduled end, the scheduling service automatically sends commands over the network to the charging station to terminate the charging session in accordance with the predetermined schedule. Concurrently, the connector is unlocked from the charging port of the EV in parking space 102-B. This ensures that the end-user is billed precisely for the duration of charging that occurs within their reserved time slot. Subsequently, a second EV owner, who has a reservation for the following time slot and is parked in space 102-C, is then able to connect their EV to the now-available charging station and commence their own charging session.

By way of example, consider a scenario for which two EV owners, Owner A and Owner B, have scheduled back-to-back time slots at the same EV charger 104. Owner A has a scheduled charging session from 2:00 PM to 3:00 PM and has parked their vehicle in parking space 102-B. Owner B is scheduled to charge their vehicle immediately following Owner A's session, from 3:00 PM to 4:00 PM, and upon arrival to the EV charger 104, parks in parking space 102-C. As Owner A's charging session nears completion, the scheduling service controlling the operation of the EV charger 104, sends a notification to the client device of Owner A, who in this instance is not present as their session concludes.

At the scheduled end of Owner A's session, the scheduling service automatically sends commands to the EV charger 104 to cease charging and, upon conclusion of a grace period, to unlock the connector from Owner A's EV. This action is performed in accordance with the charging schedule to ensure that Owner A is billed only for the time slot they reserved. Owner B, parked in parking space 102-C, finds that the EV charging station 104 is ready for use, even though Owner A is absent. Owner B can then remove the connector from the charge port of Owner A's EV and connect it to their own EV. Upon connecting, Owner B interacts with the user interface on their client device to initiate their charging session. The scheduling service verifies the start of Owner B's reserved time slot and activates the power delivery to the charging station 104. Throughout this process, the scheduling service ensures that each owner is billed only for their respective reserved time slots and the actual electricity consumed during their sessions.

This configuration not only streamlines the charging process for EV owners but also allows for efficient management and utilization of the EV charging station's resources, including parking spaces. By enabling EV owners to reserve charging times, the scheduling service enhances the overall user experience, allowing for better time management while reducing, if not eliminating, wait times and the uncertainty and frustration associated with finding an available EV charger. The integrated billing system offers a solution to the problem of cost recuperation for property owners and businesses, encouraging the adoption of charging infrastructure by providing a clear path to profitability or cost recovery.

Figure 2:
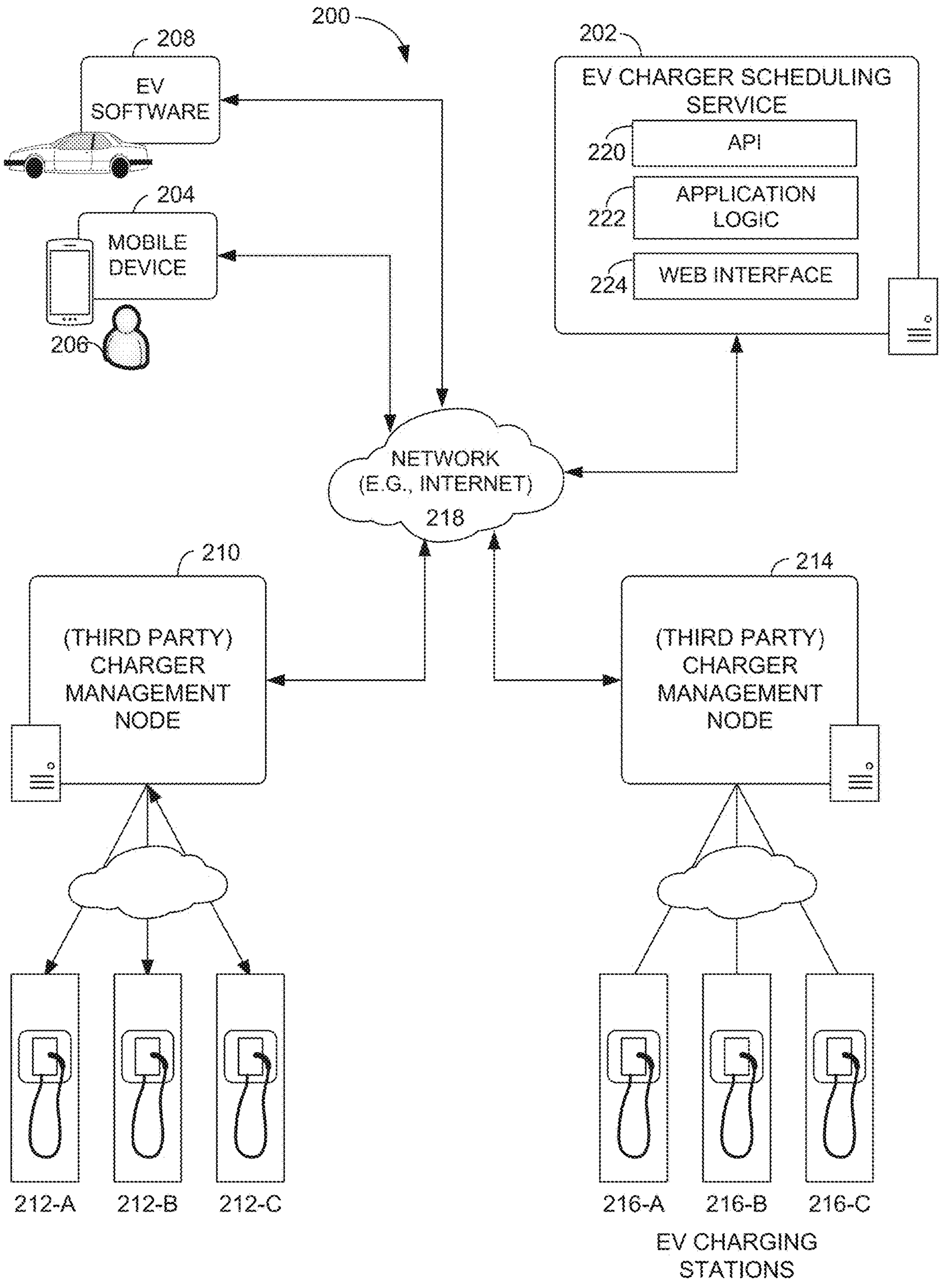
FIG. 2 is a diagram illustrating an example of a computer network-based technology platform that includes an EV charger scheduling service, consistent with some examples.

FIG. 2 is a diagram illustrating an example of a computer network-based technology platform 200 that includes an EV charger scheduling service 202, consistent with some examples. The EV charger scheduling service 202 is a central component of the overall system, designed to facilitate the reservation and management of electric vehicle (EV) charging sessions, on a per EV charger basis. For simplicity and ease of understanding, the EV charger scheduling service 202 is depicted in FIG. 2 as comprising three components: an Application Programming Interface (API), application logic 222, and a web interface 224. A more detailed view and description of the EV charger scheduling service 202 is presented below, in connection with the description of FIG. 3.

The API 220 of the scheduling service serves as a conduit for communication between the EV charger scheduling service 202 and the EV chargers 212-A, 212-B, 212-C, 216-A, 216-B and 216-C. Consistent with some examples, the communication via API commands or requests is indirect, occurring through an intermediary shown in FIG. 2 as the charger management nodes 210 and 214. The API enables standardized methods for configuring EV chargers, and for sending and receiving data to and from the EV chargers, which may be located at various sites and managed by different entities.

Consistent with some examples, the overall system 200 may utilize an existing API, such as the Open Charge Point Protocol (OCPP), to facilitate communication between the EV charger scheduling service 202 and the EV chargers 212-A, 212-B, 212-C, 216-A, 216-B, and 216-C. OCPP is a protocol that provides a uniform and interoperable interface between charge point hardware and charge point management software. The protocol is designed to accommodate various charge point manufacturers and network operators, enabling a broad range of functionalities and services.

OCPP specifies a collection of standardized messages and data structures that are exchanged between a charge point (e.g., an EV charger or EV charging station), the charger management nodes 210 and 214, and the scheduling service 202. For example, in the vernacular of OCPP, a "StartTransaction" command initiates a charging session when an EV connects to a charger, while the "StopTransaction" command ends the session, typically when the EV disconnects, the end-user manual opts to end the charging session via the UI of a client device and application, or the reserved time slot concludes. The "StatusNotification" command is used to inform the scheduling service 202 of changes in the status of the EV charger, such as availability, occupancy, performance characteristics, and/or faults. Additionally, a "Heartbeat" command is a periodic signal sent by the EV Charger to indicate its operational status and maintain connectivity with the scheduling service 202.

These API commands or requests facilitate the operation of the EV charger scheduling service 202, allowing for precise control over the charging process and real-time monitoring of EV charger status. By leveraging a standardized API, the scheduling service 202 ensures compatibility and ease of integration with a diverse ecosystem of charging infrastructure, thereby enhancing the scalability and flexibility of the scheduling service.

The charger management nodes 210 and 214 serve as intermediaries that facilitate the flow of information and commands between the EV charger scheduling service 202 and the individual EV chargers (e.g., 212-A, 212-B, 212-C, 216-A, 216-B, and 216-C). Consistent with some embodiments, these management nodes may be deployed, owned, and operated by third parties. However, in other instances, the same entity that provides the scheduling service may deploy, own and operate these management nodes, ensuring direct control over the charging infrastructure. Additionally, in some instances, there may be a mix of ownership and operational models where some nodes are owned and operated by third parties, while others are directly managed by the scheduling service provider. In any case, these EV charger management nodes 210 and 214 orchestrate the operations of the EV chargers, which may be organized into different groups or networks, each potentially associated with a distinct owner and/or operating entity. For instance, one charger management node 210 may manage EV chargers 212-A, 212-B and 212-C located at a public parking facility, while another charger management node 214 oversees EV chargers 216-A, 216-B and 216-C within a private residential complex. This hybrid approach allows for flexibility in managing the operations of EV chargers, which may be organized into different groups or networks across multiple sites, all managed by a central server. This central server receives commands from the backend system and relays them to the respective chargers, ensuring uniformity and efficiency in managing the charging infrastructure.

Each charger management node 210 and 214 is responsible for a subset of chargers and handles the specific requirements and configurations of its associated chargers. This includes managing the scheduling of charging sessions, processing commands such as "StartTransaction" or "StopTransaction", and ensuring that the EV chargers are functioning correctly by monitoring "StatusNotification" messages. The charger management nodes 210 and 214 also play a role in billing and access control by relaying information from the EV chargers to the scheduling service 202.

In some instances, the charger management nodes 210 and 214 are configured to primarily act as a bridge, passing commands received from the scheduling service 202 to the appropriate EV charger. When an end-user interacts with the scheduling service 202 via a client computing device (e.g., mobile device 204 or the EV with EV software 208), the scheduling service translates these interactions into API commands, which are then relayed to the EV chargers through the relevant charger management nodes 210 and 214. For example, when an end-user wishes to start a charging session, the scheduling service 202 sends over the network 218 a "StartTransaction" command to the relevant charger management node 210 or 214, which in turn communicates with the designated EV charger to begin the charging session. Similarly, when a charging session is to be ended, the "StopTransaction" command flows through a charger management node 210 or 214 to signal the EV charger to cease charging and unlock the connector.

The charger management nodes 210 and 214 are thus integral to the operation of the EV charging infrastructure, providing a scalable and efficient means to manage multiple chargers across various locations. They enable the scheduling service to maintain a high level of control and oversight over the charging network, ensuring that end-users receive a consistent and reliable charging experience.

As depicted in FIG. 2, each EV charger (e.g., 212-A, 212-B, 212-C, 216-A, 216-B, and 216-C) within the system is equipped with hardware that facilitates real-time communication over a wired or wireless network. This communication capability allows for connecting each EV charger with its respective charger management node 210 or 214. The hardware enables the exchange of data and commands, allowing for the remote configuration of EV chargers and management of charging sessions and the monitoring of charger status.

Consistent with some examples, the EV charging stations integrated into the system are not only accessible for charging purposes but are also configurable remotely via the scheduling service 202. Each charging station is assigned a unique identifier, which serves as a distinct address for the scheduling service 202 to communicate with and manage the charger. This unique identifier allows for distinguishing each EV charger within the network, ensuring targeted management of individual charging stations.

Administrators of the scheduling service 202 can utilize this unique identifier to remotely access each EV charger's settings and configurations. Through the scheduling service's interface, administrators have the capability to adjust various parameters of the EV charger, such as the maximum power output, the general availability of the charger, management (e.g., updating) of firmware, details relating to the electricity rates over time, and so forth. This level of access allows for tailoring the charging experience to the specific needs of the location where the EV charger is installed, whether it be a private residence, a public parking facility, or a commercial establishment.

The remote configurability of the EV chargers via the scheduling service not only enhances operational efficiency but also allows for rapid response to any required changes in charger settings. For example, if a particular EV charger needs to be taken offline for maintenance or if there is a need to update the charging rates due to changes in electricity pricing, the administrator can make these adjustments without the need for physical interaction with the EV charger. This feature of the system underscores the flexibility and adaptability of the EV charging infrastructure, providing a robust and user-friendly solution for managing a network of EV chargers.

In some configurations, an EV charging station may be equipped with a single connector, designed to charge one EV at a time. This setup is common in scenarios where space or power supply constraints limit the number of connectors. On the other hand, there are scenarios where an EV charging station may feature multiple connectors, allowing for the simultaneous charging of several EVs. In such multi-connector stations, the scheduling service 202 is configured to schedule each connector independently, ensuring that multiple users can access charging services concurrently without interference.

The power delivery capabilities of each charger can vary based on several factors, including the hardware specifications of the charger itself, the power supply infrastructure, and the requirements of the connected EV. For instance, some chargers may offer standard Level 1 charging, suitable for overnight charging scenarios, while others may provide faster Level 2 charging or even rapid DC fast charging capabilities.

In some instances, a single location may have charging stations that have different connectors that are compatible with different charging ports. By way of example, a single location may have multiple charging stations, where one or more charging stations use connectors compatible with the North American Charging Standard (NACS) connector, while one or more other charging stations have connectors compatible with Combined Charging System (CCS).

Consistent with some embodiments, the scheduling service 202 is adept at obtaining and presenting these charger parameters to the end-user through the user interface. This allows end-users to make informed decisions when selecting an EV charger to reserve, choosing one with the charging characteristics that best suit their specific model of EV and their charging needs. For example, an end-user with a high-capacity battery EV may opt for a fast charger to minimize downtime, while another user with a plug-in hybrid may choose a standard charger for a slower, more economical charge. The scheduling service thus enhances user experience by providing transparency and control over the charging process, tailored to individual preferences and vehicle requirements.

Consistent with some embodiments, instead of having a user select a specific charging station via the user interface of the mobile app, the scheduling service will instead prompt the user to specify a time slot, and the scheduling service will automatically select an appropriate charging station for the user based on information about the EV that is owned by the end-user. For example, with some embodiments, the user may be prompted to provide information about his or her EV (e.g., make and model), and indicate whether or not the end-user owns various types of adapters that are compatible with specific types of connectors. Accordingly, the scheduling service employs logic to automatically match the end-user with the best available EV charger, based on this information about the EV owned by the end-user. This matching process considers factors such as the EV's battery capacity, the required charging speed, and the compatibility of the charger's connector with the EV's charging port. For example, if an end-user's vehicle supports CCS connectors, the system will prioritize chargers equipped with CCS connectors in its recommendations. However, if the end-user has previously specified that he or she owns an appropriate adapter, the scheduling service may prioritize reserving a charging station with the connector that natively matches the EV, but could also reserve a charging station that is compatible with an adapter owned by the user.

Consistent with some embodiments, the system offers flexibility in charger selection. At locations where multiple types of chargers are available, such as both Level 2 and Level 3 chargers, the system may present these options to the end-user. The user can then make an informed choice based on their immediate needs and preferences. For instance, if both charger types are available at a desired location, the user could choose a Level 3 charger for faster charging if they are in a hurry, or a Level 2 charger if they plan to stay in the area longer and prefer a slower, potentially less costly charging session.

With some embodiments, the scheduling service will ensure that a selected charger is fully compatible with the user's EV by automatically filtering out chargers that do not have a compatible connector. This automated selection process enhances user convenience by eliminating the need to manually verify connector compatibility, thereby streamlining the reservation process and ensuring that the user's charging experience is as efficient and seamless as possible.

The application logic 222 of the EV charger scheduling service 202 may include a configuration component that allows an administrator to tailor the functionality of the scheduling service to meet the specific needs of each charger management node 214 or individual EV charger. For instance, the duration of available time slots for an individual charger or a group of chargers may be configurable to accommodate different charging needs. Similarly, the grace period—the time allowed after a charging session ends before incurring additional fees—may also be configurable. This flexibility ensures that the scheduling service can adapt to various operational requirements, such as those of a private residential complex, a public charging station, or a commercial establishment.

Consistent with some examples, end-users access the scheduling service 202 over a network 218, such as the Internet, from a diverse array of client computing devices (e.g., EV software 208 integrated with an EV, or a mobile device 204). This access may be facilitated by an application executing as part of a computing device that is internal to the EV, such that the user interface is presented on the infotainment display of the EV. In some examples, the client application may be OS-specific, such as an app that may be downloaded and installed from an app store for a specific mobile device platform, including but not limited to iOS® or Android®. Alternatively, the client software application may be web-based, making it accessible via any web browser on any form factor of a computer, be it a laptop, desktop, tablet, or mobile device.

Although not illustrated in FIG. 2, the system 200 may also include an integrated digital assistant service that operates as a chatbot, utilizing advanced machine learning techniques, such as those provided by generative language models, including large language models. This digital assistant enhances user interaction with the scheduling service by allowing end-users to communicate directly with the system to manage their charging sessions. Through natural language processing, the chatbot can understand and execute commands such as “start charging,” “stop charging,” or “extend my session,” thereby facilitating a more interactive and user-friendly experience. This feature is particularly beneficial for users who prefer real-time, conversational engagement with the system, providing a seamless interface to control the operations of a charger during a scheduled charging session.

Additionally, not depicted in FIG. 2, the system 200 may incorporate a conventional messaging interface, such as an SMS or text messaging service. This integration allows end-users to control the operation of a charger by sending text messages to a specific address or number designated by the scheduling service. For example, users can initiate a charging session by texting “start” to the service or end a session early by texting “stop.” This method provides a straightforward and accessible way for users to interact with the charging system, especially when they prefer not to use a smartphone application. The SMS interface ensures that users without access to internet-connected devices or those who find traditional apps cumbersome can still manage their charging sessions efficiently.

Both the chatbot and SMS interfaces are designed to work in conjunction with the existing components of the system 200, such as the API and the charger management nodes, to ensure a cohesive and unified user experience. These additional communication channels enhance the system’s flexibility and accessibility, catering to a broader range of user preferences and technological capabilities. By integrating these advanced and conventional communication methods, the system 200 not only simplifies the process of managing EV charging sessions but also broadens its appeal to a diverse user base.

Figure 3:
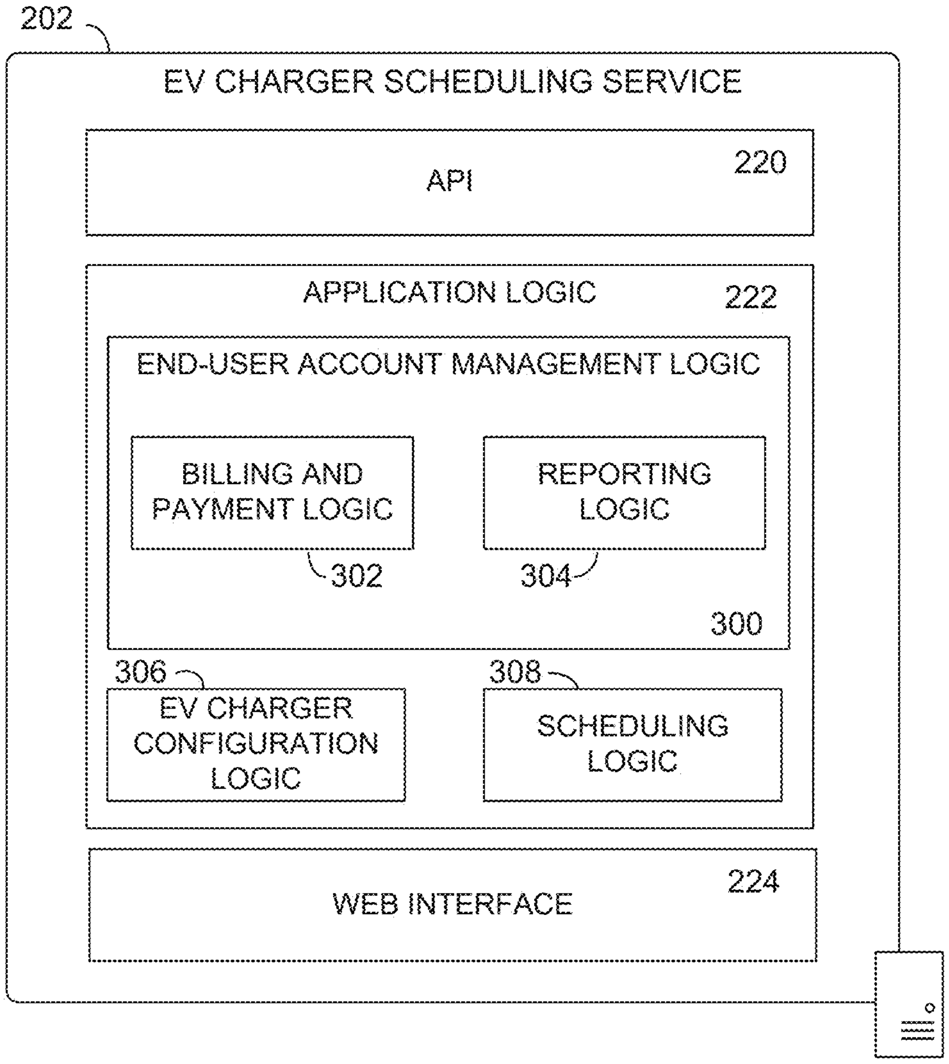
FIG. 3 is a diagram illustrating a detailed view of an EV charger scheduling service, consistent with some examples.

FIG. 3 is a diagram illustrating a detailed view of an EV charger scheduling service 202, consistent with some examples. As shown, the scheduling service 202 includes an API 220, which serves as the communication gateway between the scheduling service 220 and the EV chargers. In some examples, the API 220 adheres to the Open Charge Point Protocol, a standardized protocol that facilitates interoperability in the EV charging ecosystem. OCPP defines a set of messages and data structures that enable the exchange of information between charging stations and central management systems, including the scheduling service 202. This protocol supports various operations such as remote charger monitoring, transaction initiation and termination, firmware management, and error reporting. By implementing OCPP, the scheduling service 202 ensures compatibility with a wide range of charging station hardware, allowing for a scalable and flexible charging network.

In some examples, the web interface 224 of the EV charger scheduling service 202 includes a web server component that renders the service accessible via standard web browsers, and other web-based client software applications. This web interface 224 allows users to interact with the scheduling service 202 from any device with internet access, providing a convenient and user-friendly means to manage charging sessions. Through the web interface 224, users can view charger availability, reserve charging slots, and receive real-time updates on their charging status. The web interface component 224 is designed to handle requests from multiple users simultaneously, ensuring that the scheduling service 202 can cater to a high volume of concurrent sessions without compromising performance.

Consistent with some examples, the application logic 222 is the core of the scheduling service 202, encompassing various sub-components that handle specific functionalities. The end-user account management logic 300 is responsible for managing user profiles, authentication, and session management. This logic 300 ensures that users can securely create and access their accounts, manage their personal and payment information, and maintain a history of their charging sessions. The billing and payment logic 302 is integrated with the account management logic 300 and handles all financial transactions related to the charging services. It calculates the cost of charging sessions based on energy consumption and time, processes payments, and manages billing disputes. The reporting logic 304 generates reports and analytics, providing insights into usage patterns, station performance, and financial metrics, which are essential for operational decision-making and strategic planning.

The EV charger configuration logic 306 allows administrators of the scheduling service to configure and manage individual charging stations remotely. This includes setting charging parameters, scheduling maintenance, and updating firmware. By utilizing this logic 306, an administrator of the scheduling service 202 can optimize the performance of each charger to meet specific requirements, such as adjusting the power output to match the grid’s capacity or the user’s charging needs. Lastly, the scheduling logic 308 is dedicated to managing the reservation of charging slots. It ensures that users can schedule their charging sessions based on real-time availability, and it coordinates the allocation of charging resources to maximize station utilization.

In some embodiments, the scheduling logic 308 of the application logic 222 is tasked with the function of dispatching instructions and commands to individual EV chargers in alignment with the established charging schedule. This logic orchestrates the timing and execution of charging sessions, ensuring that each EV charger initiates and concludes charging processes precisely as reserved by end-users. Additionally, the scheduling logic 308 incorporates a dynamic reservation system that automatically reserves chargers based on availability and the specific charging capacity requirements of the end-user’s vehicle. This tailored approach optimizes charger allocation, ensuring that each vehicle is matched with a charger that can provide an efficient charging experience based on the vehicle’s battery capacity and charging capabilities.

Moreover, the scheduling logic 308 is also responsible for maintaining a line of communication with client applications utilized by end-users. It sends timely notifications to these applications, alerting users about upcoming or active charging time slots, any changes to their scheduled sessions, and other pertinent information. This proactive communication ensures that users are kept informed and can manage their charging needs effectively, enhancing the overall user experience and optimizing the utilization of the charging infrastructure. Through this intelligent scheduling and communication, the system not only improves operational efficiency but also supports a more user-centric approach to managing EV charging.

Consistent with some embodiments, the application logic 222 also includes matching logic that plays a role in automatically selecting the most appropriate EV charger for a specific scheduling request by an end-user, particularly useful in scenarios where a location has multiple EV chargers or charging stations. When an end-user selects a location and a desired time slot for charging, this matching logic evaluates the available chargers at the specified location and dynamically assigns the best charger based on several criteria. Specifically, the matching logic ma consider characteristics of the EV that is to be charged, prior charging behaviors of the end-user who is reserving or scheduling an EV charging session, and characteristics of the available EV charging stations at the specified location. By way of example, the following criteria may be considered in the implementation of a matching algorithm, consistent with various embodiments:

Characteristics of an Electric Vehicle (EV)

- Battery Capacity: Total energy storage capacity of the EV's battery, usually measured in kilowatt-hours (kWh).
- Accepted Charge Rate: Maximum power intake the EV can handle during charging, measured in kilowatts (kW).
- Connector Type: Type of plug the EV uses (e.g., CCS, CHAdeMO, Tesla Supercharger, Type 1 J1772, Type 2 Mennekes).
- State of Charge (SoC): Current battery level as a percentage of total capacity.
- Battery Health: Degradation level of the battery, which might affect charging speed and efficiency.
- Vehicle Class: Type of vehicle (e.g., sedan, SUV, truck, motorcycle, boat).
- Onboard Charger Specifications: Details about the EV's built-in charger that could affect compatibility with external chargers.
- Regenerative Braking: Whether the vehicle supports regenerative braking, which can impact how quickly the battery recharges during driving.
- Software Version: The version of the vehicle's firmware, which may affect charging capabilities and compatibility.

Charging Behaviors of an EV Driver

- Charging Frequency: How often the driver charges the EV, which could indicate preferred times and locations.
- Typical Duration of Charging Session: Average length of time the driver spends charging the EV.
- Preferred Charging Times: Specific times of day the driver prefers to charge (e.g., overnight, during work hours).
- Charging Location Preferences: Preferred types of locations for charging (e.g., home, workplace, public stations).
- Energy Consumption Patterns: Typical driving range between charges and energy usage, which can influence the required frequency and speed of charging.
- Response to Pricing: Sensitivity to charging costs, which might influence the choice of charger based on dynamic pricing.

Characteristics of an EV Charger

- Charger Type: Level of the charger (Level 1, Level 2, DC Fast Charger).
- Maximum Output: The highest power output the charger can provide, measured in kW.
- Number of Connectors: How many vehicles can be charged simultaneously.
- Connector Types Available: Types of connectors available at the charging station.
- Charging Station Location: Geographic location of the charger, which could include details like proximity to highways, amenities, or covered parking, near residence or work location.
- Availability: Real-time status of the charger (available, in use, out of service).
- Pricing Structure: Cost of using the charger, which may vary by time of day or day of the week.
- Network Compatibility: Whether the charger is part of a specific charging network that might offer membership benefits.
- Safety Features: Security measures in place at the charging station, such as surveillance cameras or lighting.
- Accessibility Features: Accommodations for drivers with disabilities.

Consistent with some examples, a matching algorithm designed for an EV charger scheduling service may operate by evaluating various characteristics of the electric vehicle (EV), the preferences and behaviors of the EV driver (explicit or inferred), and the features of available EV chargers to find the optimal match. The algorithm can be structured to require exact matches for certain critical characteristics, while other features may influence the selection process through a ranking or priority system, allowing for flexibility based on available options and user preferences.

For instance, the connector type is a characteristic that typically requires an exact match. Since different EVs come with different types of charging ports (such as CCS, CHAdeMO, or Tesla Supercharger), the algorithm must ensure that the selected charger has a compatible connector. This tends to be a non-negotiable aspect because a mismatch in connector type would render the charging session impossible. Therefore, the algorithm first filters out all chargers that do not offer a compatible connector with the user's EV, in some instances, taking into consideration a user's profile information, which may indicate that a user owns one or more specific adapters.

On the other hand, characteristics like the maximum output of the charger and preferred charging times may not require exact matches but could be used to rank the available chargers. For example, if an EV can accept a higher charge rate, the algorithm might prioritize chargers that can provide power at this higher rate, but it won't exclude chargers with lower rates that still meet the minimum requirements. Similarly, if a driver prefers to charge overnight but the only available chargers are free during the late evening, the algorithm might rank these options higher even though they don't perfectly match the preference. This approach allows the system to offer the best available options without being overly restrictive.

Through this combination of exact matches for essential criteria and flexible ranking for less critical preferences, the matching algorithm efficiently balances the need for compatibility with the desire for convenience and preference satisfaction. This method ensures that users are provided with practical options while maximizing the utilization of the charging infrastructure.

In some embodiments, the system also considers historical data and predictive analytics to enhance the matching process. By analyzing past charging sessions, the system can identify patterns in usage and predict future charging needs. This predictive capability allows the system to optimize the allocation of chargers, ensuring that high-demand chargers are available for users who need them most, while evenly distributing the load across the available infrastructure. This intelligent allocation not only improves user satisfaction by reducing wait times and ensuring availability but also enhances the overall efficiency of the charging station operations.

Through these advanced functionalities embedded within the application logic 222, the EV charger scheduling service 202 ensures that each user's charging experience is optimized for their specific needs, vehicle specifications, and charging preferences, thereby streamlining the process and enhancing the overall efficiency of the EV charging ecosystem.

In addition to the functionalities described, the application logic 222 allows administrators to configure the fee structure associated with each charging session on a per charger, per location, or per entity basis, such as in cases involving third-party partnerships. This configuration capability extends to various types of fees, including the cost of electricity consumed during the charging session, one-time connection fees, idle fees for occupying the charger beyond the reserved time, and cancellation fees for terminated or unused sessions.

The system provides substantial flexibility in fee management, enabling administrators to implement dynamic pricing models that can adjust fees based on different variables. For instance, fees can vary according to the time of day, with higher rates during peak hours and lower rates during off-peak hours to encourage more efficient use of the charging infrastructure. Similarly, fees can be adjusted based on different days of the month or different seasons, reflecting changes in electricity demand and supply dynamics. This dynamic pricing strategy not only helps manage the load on the electrical grid more effectively but also allows charging station operators to maximize their revenue potential by aligning charging prices with market conditions and user demand.

Furthermore, the system's robust fee configuration capabilities ensure that operators can tailor their pricing strategies to meet specific business goals and user needs. For example, a charging station located in a high-demand area might implement premium pricing to reflect the higher value of the service provided, while a station in a less busy area might offer lower rates to attract more users. This level of customization ensures that each charging station can operate optimally within its specific context, enhancing the overall efficiency and profitability of the EV charging network.

Figure 4:
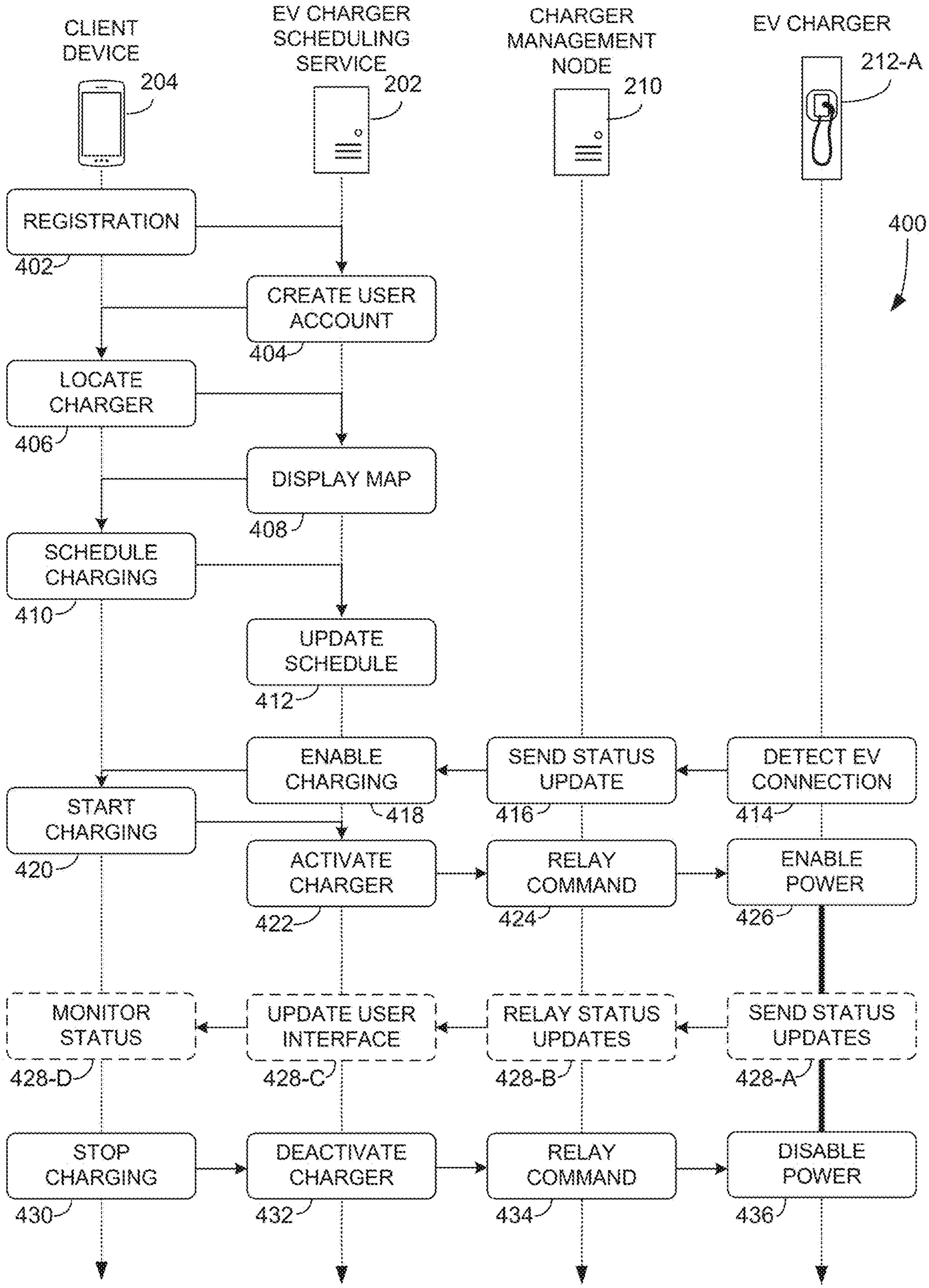
FIG. 4 is a flow diagram illustrating how various components in a system for EV charger scheduling interact and exchange data to perform various methods, consistent with some examples.

FIG. 4 is a flow diagram 400 illustrating how various components in a system for EV charger scheduling interact and exchange data to perform various methods, consistent with some examples. FIG. 4 is intended to convey the sequence and relationship of operations that occur between the client device 204, the scheduling service 202, a charger management node 210, and an individual EV charger 212-A, as an end-user registers to create an end-user account with the scheduling service, identifies an EV charger at a desired location, schedules or reserves a time slot for using the EV charger, and then uses the EV charger during the scheduled time slot. Each component plays a role in the process of managing and executing an EV charging session, as illustrated in the example.

The flow diagram 400 delineates the responsibilities attributed to each component in the system, according to some examples. As shown in FIG. 4, the client device 204, which may be a smartphone or tablet, is the interface through which the end-user interacts with the scheduling service 202. However, in various alternative embodiments, a built-in computer that is integral with an EV may execute the client application, such that the end-user can access the scheduling service to perform various operations directly via a touchscreen display of the EV, for example, that may be part of the infotainment component of the EV. The scheduling service 202 acts as the central hub, processing end-user requests, managing charging schedules, and coordinating with the charger management nodes 210. The charger management node 210 functions as an intermediary, facilitating communication between the scheduling service 202 and the EV chargers (e.g., EV charger 212-A in FIG. 4). The EV charger 212-A represents the physical charging hardware that delivers power to the EV (not shown).

The arrows within the diagram 400 of FIG. 4 are intended to illustrate the exchange of data, which includes API requests, commands, or instructions, typically communicated over a network (not shown in FIG. 4). These data exchanges facilitate the initiation of actions such as end-user registration, identifying an EV charger location, scheduling of charging sessions, and the start and stop of charging. The flow of information is bidirectional, with status updates and commands moving between the scheduling service 202, the charger management node 210, and the EV charger 212-A to ensure that the charging process is executed smoothly and efficiently, while data also flows between the client device 204 and the scheduling service 202.

As illustrated in the flow diagram 400 of FIG. 4, one of the first acts undertaken by the end-user involves end-user registration 402 with the scheduling service. Upon registering, the scheduling service creates an end-user account 404 for the end-user. This process begins when an end-user interacts with an application on their client device 204. The application may be a native app, specifically designed for the operating system of the device, such as iOS® or Android®, or it could be a web-based app, accessible via a conventional web browser.

Figure 5:
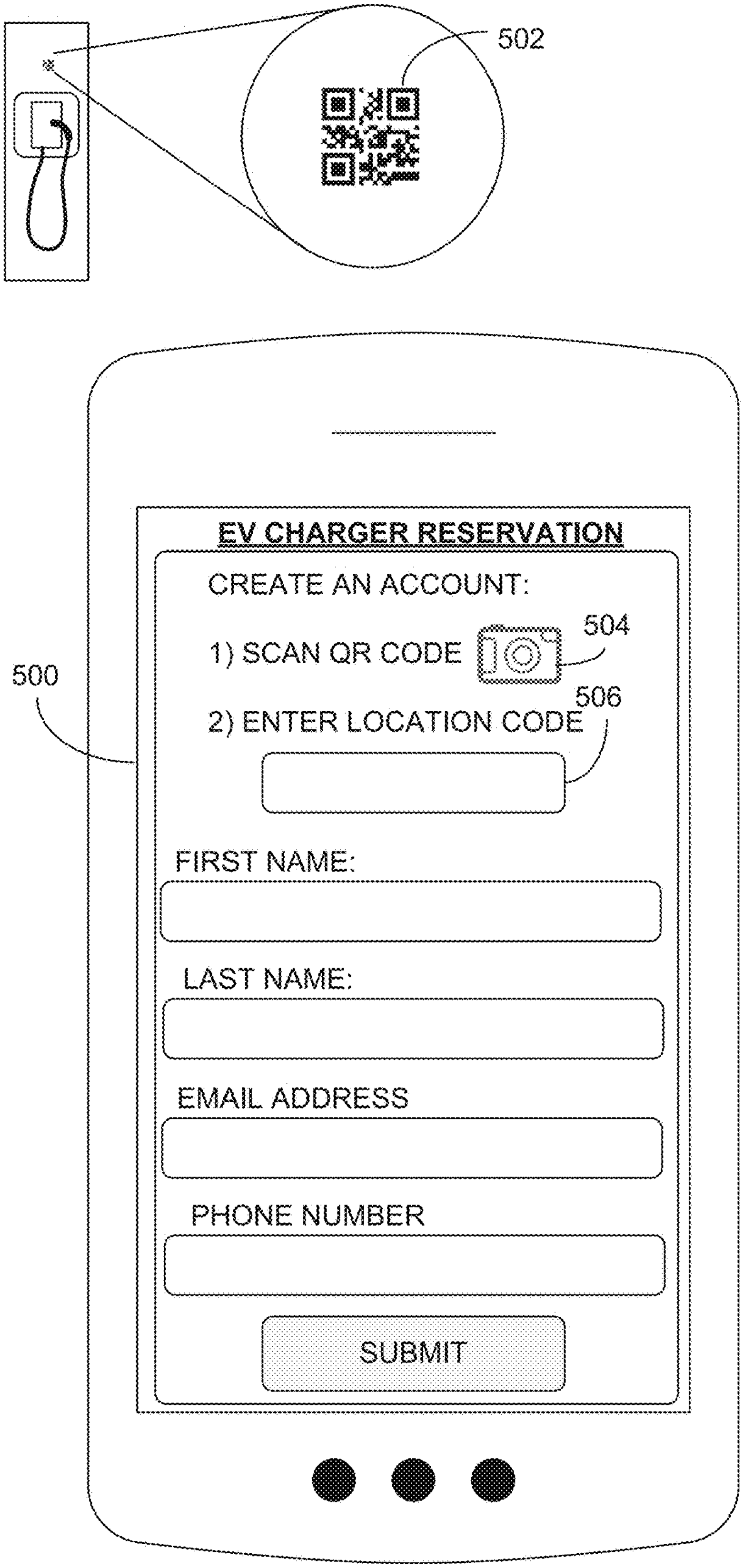
FIG. 5 through FIG. 15 are user interface diagrams, illustrating examples of various user interfaces for an EV charger scheduling application that may be accessible via a client computing device of an end-user, consistent with some examples.

In some instances, the provider of the scheduling service may present one or more QR codes to facilitate the end-user registration process. One version of the QR code, when scanned by an end-user's device 204, may direct an application executing on the client device 204 to obtain and present an end-user registration user interface, via which the end-user is prompted to provide various items of information to establish an end-user account. FIG. 5 illustrates an example of such a user interface, where the end-user is asked to enter personal details such as their first name, last name, email address, and phone number.

Referring now to FIG. 5, the user interface 500 of the application represents an example of an end-user registration interface as presented on a mobile device 202. This interface 500 is designed to facilitate the process of creating a new end-user account with the EV charger scheduling service 202. The UI is structured to be intuitive and user-friendly, guiding the end-user through the necessary steps to complete their registration.

Within this registration interface, the end-user is prompted to provide essential information such as their first and last name, an email address, and a telephone number. These details allow for establishing the user's identity within the system and for enabling communication between the scheduling service 202 and the end-user. In some instances, the end-user may be prompted to enter a location code 506. This location code can be manually inputted into the designated field or, for added convenience, it may be automatically filled in when the end-user scans a QR code 504. Such QR codes are specifically encoded to include the location code for a particular EV charger or a location where several EV chargers are available. This automated feature streamlines the registration process by reducing the need for manual data entry and minimizing the potential for errors.

In some examples, in the context of the EV charger scheduling service 202, EV chargers may be differentiated into two distinct categories: private and public. Public chargers are designed to be universally accessible, allowing any end-user to connect and charge their EV without restrictions. Conversely, private EV chargers are typically reserved for specific users or groups, such as residents of a multi-family residential building, where the EV chargers are not available for public use. To streamline access to these private chargers, the scheduling service 20 may utilize QR codes 502 that, upon scanning during the registration process, automatically populate the appropriate field 506 with the location code for the EV charger. For instance, a resident of an apartment complex with a private EV charger can scan a provided QR code, which inputs the location code into the application, granting them the ability to immediately schedule a charging session for that specific charger. However, not all instances grant instant access; in some cases, the inclusion of a location code triggers a background verification process managed by the scheduling service. This process ensures that only authorized users, who have been verified and approved, are granted the privilege to reserve time slots at the private EV charger corresponding to the location code. This dual approach balances ease of access with the need for security and exclusivity in private charging environments.

In some embodiments, the scheduling service 202 may also implement a time-based reservation system for one or more chargers, or all chargers at a particular location. This system allows chargers to be reserved for specific portions of the day while remaining open or free to use during other portions. For example, a charger in a corporate office parking lot might be reserved exclusively for employees during business hours, from 9 AM to 5 PM, and then open to the public outside of these hours. Through the application interface, these chargers would not be listed as available for reservation at all times but would instead display availability only during specific hours designated for public or restricted use. This approach allows for efficient management of charger utilization, catering to the needs of specific user groups during certain times while still offering broader access at other times. This method ensures optimal use of charging infrastructure and accommodates the varying demands of different user groups within a community or facility.

Additionally, the registration interface 500 may present a service agreement (not shown in FIG. 5) to the end-user. As part of the registration process, the end-user may be asked to review and agree to the terms and conditions of the service. This agreement outlines the rights and responsibilities of both the service provider and the end-user, ensuring that all parties have a clear understanding of the service's usage policies.

Furthermore, the registration interface 500 may include an option for the end-user to grant permission for their telephone number to be used for SMS or text messaging. By consenting to this, the end-user allows the scheduling service 202 to send notifications directly to their mobile device via SMS or text message. These notifications could include updates on charging session status, reminders for upcoming reservations, or alerts about changes to the service. The use of SMS messaging enhances the communication capabilities of the service, providing timely and convenient updates to the end-user.

Figure 6:
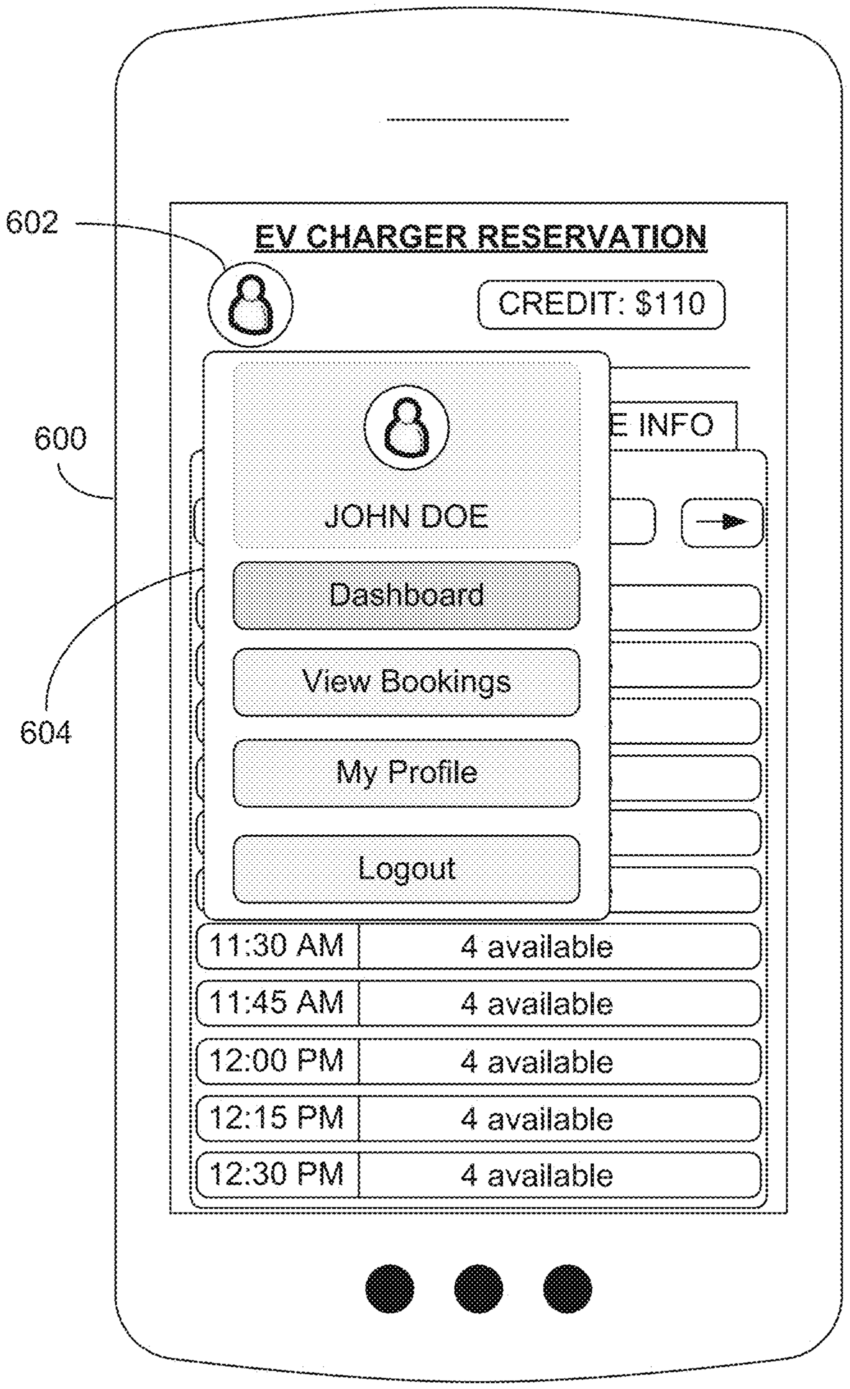

The user interface 600, as depicted in FIG. 6, provides a detailed view of the application's navigation panel, once the end-user has successfully established an end-user account. Upon logging into the application, the end-user can interact with UI component 602, typically represented as a menu icon or button, which triggers the display of a navigation panel 604. This navigation panel 604 serves as the navigation control hub for accessing various features of the application. The navigation panel 604 is designed to enhance user experience by offering a range of options, including a "Dashboard" for an overview of the user's activities and charger status, "View Bookings" to check upcoming and past reservations, "My Profile" for managing personal and payment information, and a "Logout" option for securely exiting the application. Each option is clearly listed, allowing for easy and intuitive access to the different sections of the application, ensuring that users can efficiently manage their EV charging needs.

Figure 7:
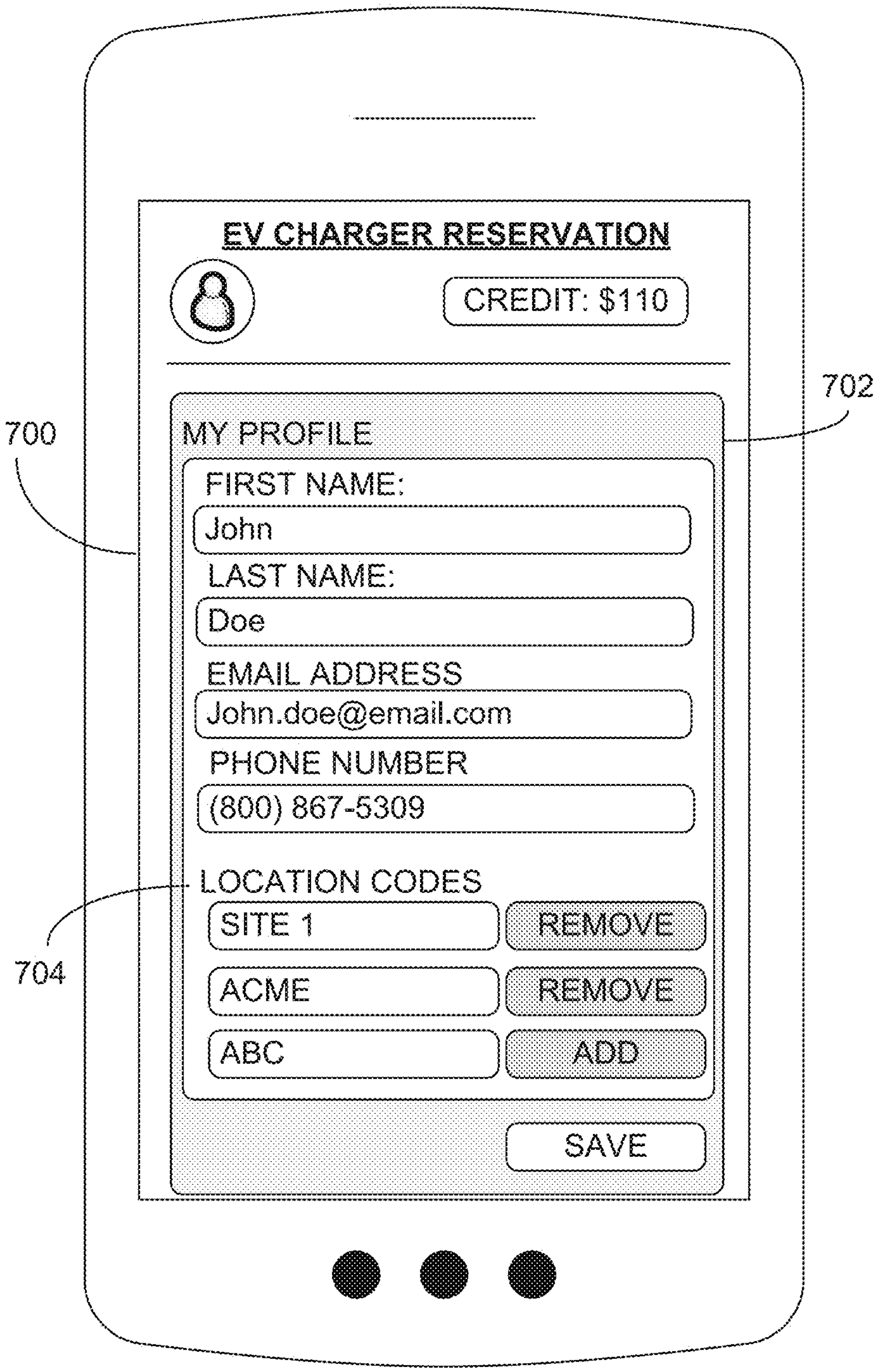

The user interface 700, as illustrated in FIG. 7, presents a profile view 702 for the end-user within the EV charger scheduling application. This interface 700 displays the personal information provided by the end-user during the account creation process, including their first and last name, email address, and telephone number. Additionally, it includes details about the end-user's vehicle, such as make, model, and battery capacity, which are essential for optimizing the charging experience. The profile view serves as a personal dashboard where the end-user can review and manage their account details, including vehicle information. This interface 700 also allows the end-user to manage and edit the location codes associated with any private EV chargers they have access to, ensuring they can easily access chargers suited to their vehicle's specific charging requirements. This comprehensive profile management supports a more personalized and efficient use of the charging network.

For example, within the profile view 702, the end-user may be presented with a list of location codes 704 that correspond to specific EV chargers they frequently use. Each location code is linked to one or more EV chargers situated at locations that are significant to the end-user, such as their apartment complex or workplace. In this scenario, the end-user might have a location code for their residential complex, labeled as "SITE 1," and another for their workplace, labeled as "ACME." These codes control access to the chargers via the app; a charger, or multiple chargers at one location, may only be visible and accessible to a user if they have entered the appropriate code. Once access is granted, reserving a charger occurs in the same manner as with any other charger, allowing the end-user to quickly access and schedule charging sessions at these private chargers without having to search for them each time. The interface also allows for the addition or removal of location codes, providing the end-user with the flexibility to update their charging preferences as needed, such as when they move residences or change employment locations. This system ensures that only authorized users can view and reserve these chargers, enhancing security and personalization of the charging experience.

Although not shown in FIG. 7, the profile user interface 702 may include additional information, such as data relating to the various EVs owned by the end-user, including information about the charging parameters of those EVs. This comprehensive data may encompass battery capacity, preferred charging level (e.g., Level 1, Level 2, or DC fast charging), and typical usage patterns. In some cases, this information can be used to filter EV chargers to include only those that are compatible or meet end-user specified charging preferences. This filtering may occur, for example, when an end-user searches for an EV charger, or when an end-user is viewing the available time slots for a group of chargers at a particular location.

Additionally, the system can utilize the battery data and usage patterns to recommend chargers. For instance, if an end-user frequently depletes their battery to a low level, the system might recommend chargers that offer faster charging capabilities to minimize downtime. Conversely, for users whose usage patterns indicate less frequent or urgent need for rapid charging, the system might suggest chargers that provide slower, more energy-efficient charging options. This tailored approach ensures that recommendations are not only based on compatibility but also on optimizing the charging experience according to individual usage habits and vehicle requirements.

Referring again to FIG. 4 and continuing the description of the method steps illustrated therein, the "locate charger" 406 and "display map" 408 steps represent an example of an end-user's interaction with the EV charger scheduling application on the client device 204. After accessing the navigation menu 604, the end-user can select an option to view a dashboard, which may display a map or a link to a map interface that graphically represents the locations of available EV chargers, searchable by location. This map view is a feature that aids users in identifying the physical locations of EV chargers relative to their current position or a desired destination.

The interaction between the client device and the scheduling service during this process involves the client device sending a request to the scheduling service to retrieve the relevant charger data, for example, based on a location of the end-user or based on a location specified by an end-user. The scheduling service 202 then processes this request and responds with the necessary information, which the client device 204 uses to update the map view. This dynamic exchange ensures that the end-user has access to real-time data about charger locations and status, enhancing their ability to make informed decisions about where and when to charge their electric vehicle.

Figure 8:
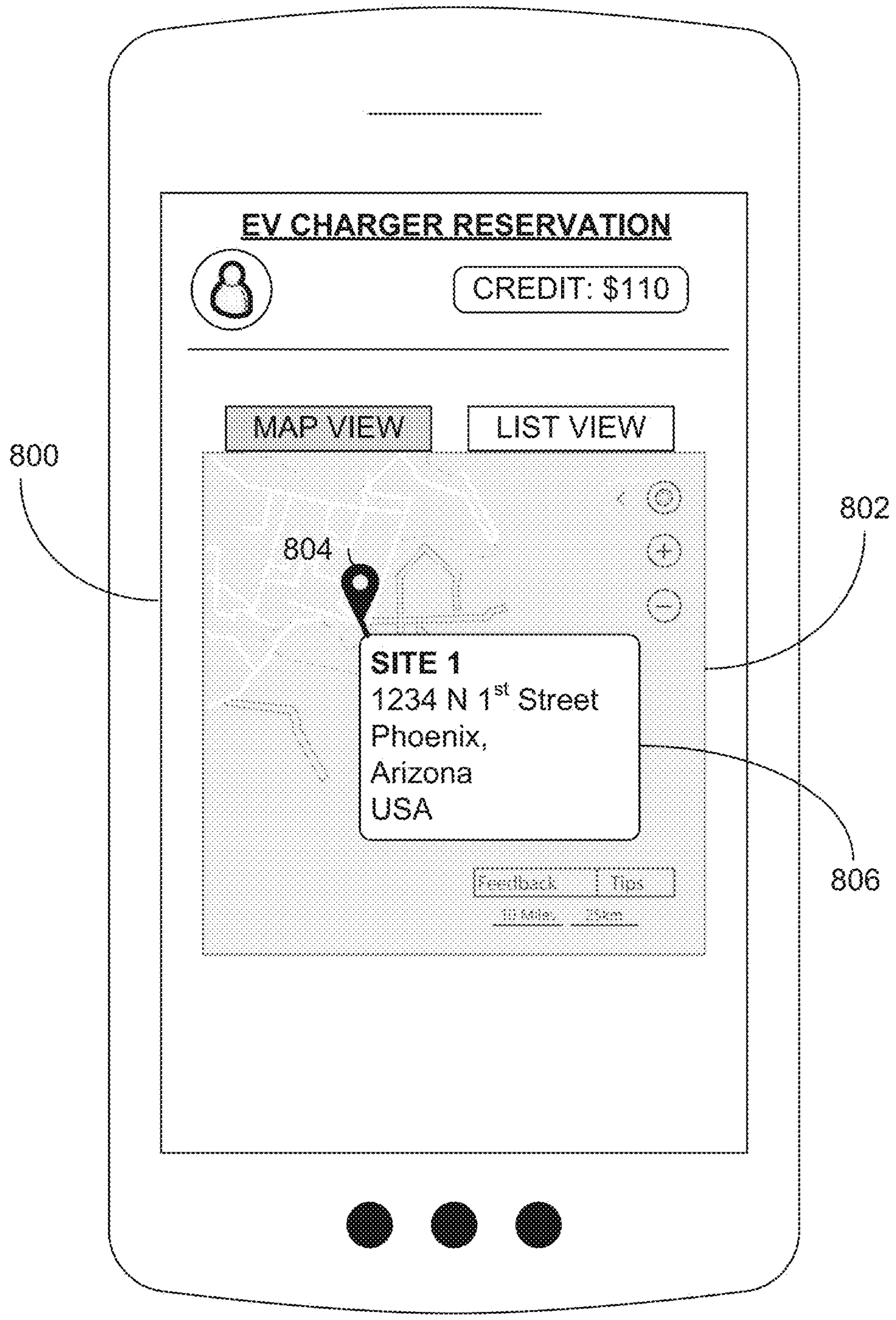

An example of a user interface 800 with a map view 802 is presented in FIG. 8. Within the map view 802, the end-user may have the ability to perform searches by location, allowing them to find chargers in specific areas such as near their home, workplace, or along a planned travel route. Additionally, this map view integrates functionalities that allow users to locate nearby amenities such as food outlets and rest stops, enhancing the travel experience by identifying comprehensive service areas that cater to both charging needs and personal comfort.

The map view 802 also offers filters to narrow down the search results based on specific EV charger characteristics, such as the type of charger (Level 1, Level 2, or DC Fast Charger), current availability, future availability, and compatibility with the user's EV model. This functionality ensures that users can find the most suitable charging stations that not only meet their vehicle's requirements but also align with their travel plans, including stops for meals or rest, thereby optimizing their route for efficiency and convenience.

When an end-user selects a location pin 804 on the map, which represents one or more EV chargers, the application is designed to present additional information 806 to enrich the user's understanding of that particular charging location. As illustrated in the example, the location card with reference 806 is indicative of an EV charger's location. This card can provide details such as the address, the number of available chargers, the types of connectors, charging speeds, and any relevant operational hours. This immediate access to detailed information allows the end-user to make quick and informed decisions about their charging needs.

Beyond the map view 802, the application may also offer a list view as an alternative method of displaying EV chargers. This list view can organize chargers based on various criteria, such as the frequency of use by the end-user, indicating which chargers they have recently utilized. Additionally, chargers can be sorted based on whether the end-user has marked them as "favorites" or "saved" within the application, allowing for quick access to preferred charging locations.

The list view also integrates the concept of private EV chargers. These are EV chargers that the end-user has exclusive access to, which is typically granted after the end-user enters a specific location code associated with those chargers. This could include chargers at a private residence, workplace, or any other restricted-access location. By providing a location code previously, the end-user's application is configured to recognize these private chargers and list them accordingly, ensuring that the end-user can easily schedule sessions at these exclusive spots without having to navigate through public options.

The combination of map and list views, enriched with detailed information and personalized sorting options, ensures that the end-user has a comprehensive and customized experience when using the application to locate and schedule EV charging sessions. The map view functionality is designed to be user-friendly and informative, providing end-users with a visual and interactive tool to easily locate and access EV charging stations. By integrating these features into the application, the scheduling service 202 facilitates a seamless and efficient experience for end-users planning their charging sessions.

Figure 9:
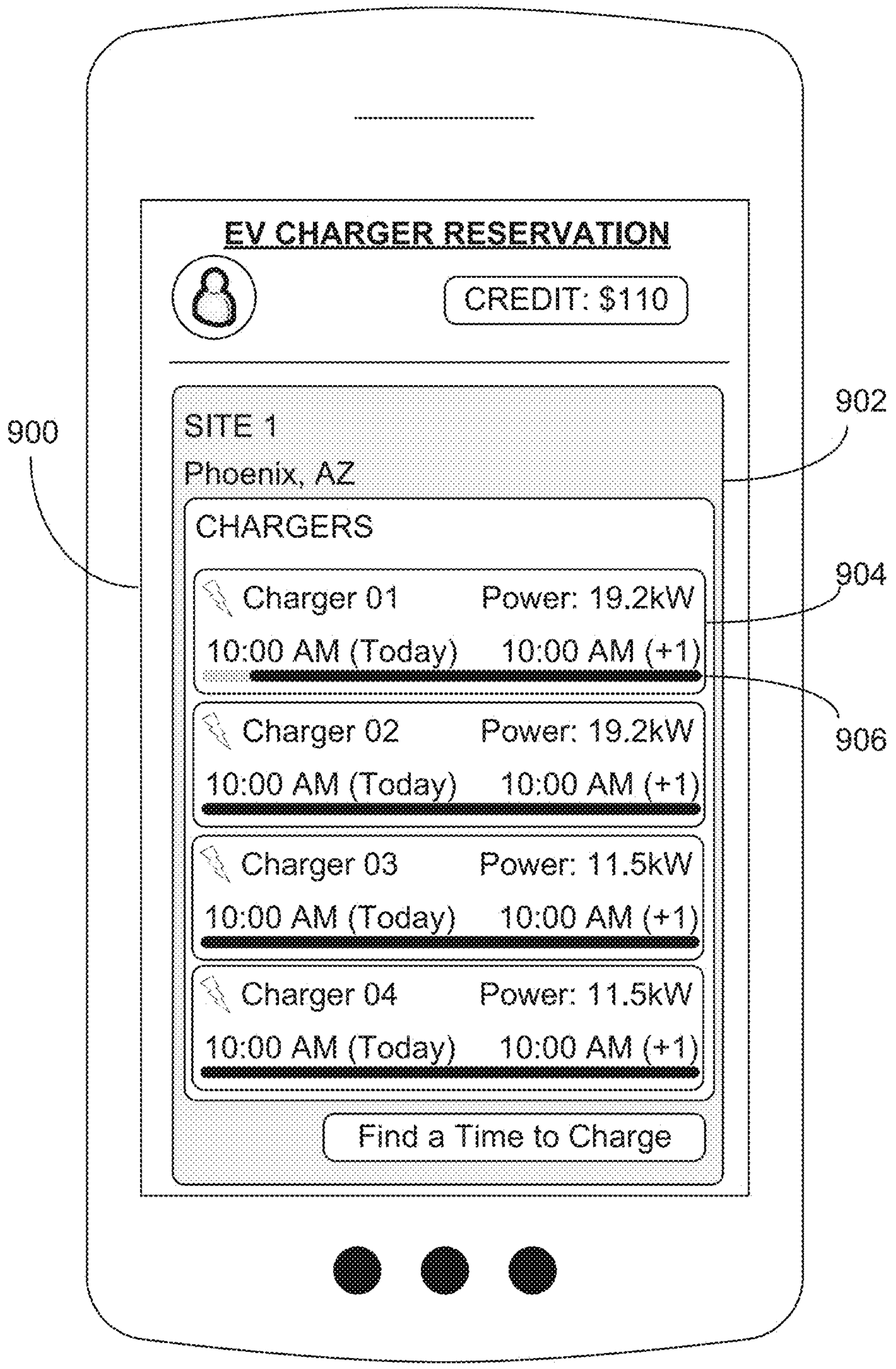

FIG. 9 illustrates a user interface 900 that offers a detailed view of a specific location, referred to here as "SITE 1", which, in this example, is equipped with four distinct EV chargers. This detailed view may be accessible via a link in the card view 806, as depicted in FIG. 8. When an end-user selects this link, they are presented with comprehensive information about the EV chargers available at SITE 1, enabling them to make informed decisions regarding their charging needs, and allowing the end-user to select a specific EV charger to reserve or schedule a charging time slot, such that the service automatically reserves the EV charger for the user.

Within the user interface 900, detailed information 902 is displayed for each EV charger, providing end-users with essential data such as the charger's identifier, the power output capability of the charger, and a quick-view graphical representation of charger availability. This information is provided to allow for end-users to identify the most suitable charger for their vehicle's requirements and to plan their charging session accordingly.

The line with reference number 906 in FIG. 9 represents a graphical timeline for each charger, designed to convey the availability of the EV charger over a set period, such as a 24-hour timeframe. The timeline 906 may be color-coded for intuitive understanding: the portion of the line that is a first color (e.g., greyed out in FIG. 9) indicates times when the charger is not available, signifying that it has been reserved for use by another end-user. Conversely, the portions of the line that are a second color (e.g., not greyed out or dark) represent times when the charger is available for reservation. This visual representation allows end-users to quickly ascertain the current and future availability of each EV charger at a glance, facilitating the process of scheduling a charging session without the need to navigate through multiple menus or read extensive text descriptions. The integration of this graphical timeline into the user interface 900 enhances the user experience by simplifying the process of identifying and reserving available charging slots.

Referring again to FIG. 4, the process of scheduling a charging session is depicted, beginning with the schedule charging step 410. Here, the client device 204, communicates with the scheduling service 202 to facilitate the reservation of a charging time slot. The end-user, through a user interface on the client device 204, selects a desired EV charger at a specific location and chooses an available time slot for charging. This selection is transmitted over a network to the scheduling service 202, which then processes the request.

Upon receiving the request, which may be for a specific time slot or for both a time slot and a specific EV charger, the scheduling service 202 performs a series of checks to confirm the availability of the selected EV charger during the requested time slot. It ensures that there are no overlapping reservations and that the charger is operational. In instances where the end-user has only selected a time slot, the scheduling service 202 automatically allocates a charger that best fits the user's requirements and the availability at the selected time. Conversely, if the end-user has specified a particular EV charger, the service checks the availability of that specific charger.

Once these checks are complete, the scheduling service 202 reserves the time slot for the end-user and updates the charger's schedule accordingly. This reservation is then reflected in the user interface of the client device 202 of the end-user, providing the end-user with a confirmation of their scheduled charging session. This dual approach allows for flexibility in how reservations are made, catering to both users who prefer to select specific chargers and those who are content with automatic allocations based on availability.

The schedule updating step 412 involves the scheduling service 202 maintaining the charging schedule for each EV charger, and end-user. As new reservations are made or existing ones are modified, canceled, and concluded, the scheduling service 202 updates data records for the schedule in real-time. This ensures that the most current availability information is always presented to end-users when they are making a reservation for a charging time slot. In some examples, the scheduling service also handles any necessary communications with the charger management nodes to ensure that the physical chargers reflect the updated schedule. If an end-user needs to change or cancel their reservation, they can do so through the client device 204, which sends a request to the scheduling service 202 to update the schedule. The service then processes this request, adjusts the reservation as needed, and communicates any changes back to the client device and the charger management node, ensuring that the EV charger is available for the new scheduled time.

Figure 10:
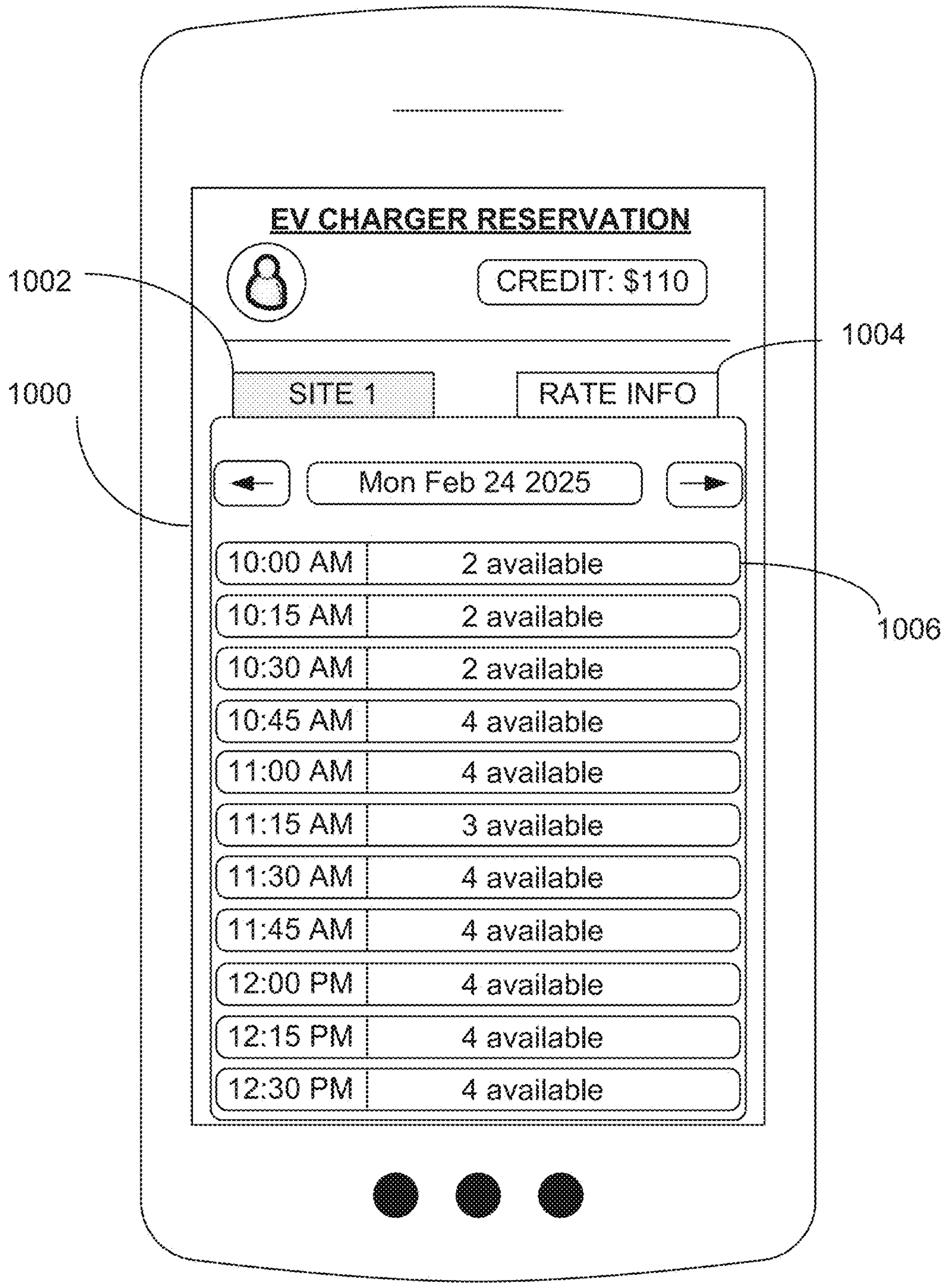

FIG. 10 illustrates an example of a scheduling user interface 1000, which is specifically designed to assist end-users in reserving an EV charging station at a particular location, as indicated by the tab with reference 1002 (e.g., "SITE 1"). This interface 1000 for the application of the EV charger scheduling service provides a streamlined and efficient method for users to select and reserve a charging session.

The interface 1000 prominently displays a list of charging session start times, such as the one denoted by reference 1006 (e.g., "10:00 AM"). Each start time is associated with a corresponding number of available charging stations at the specified location (e.g., "2 available"), allowing users to quickly determine the availability of charging stations at different times throughout the day. This feature is particularly useful for end-users who need to plan their charging sessions around their daily schedules, ensuring they can secure a charging station when it is most convenient for them.

Additionally, the user interface includes a separate tab labeled "Rate Info" with reference 1004. When this tab is selected, the interface 1000 updates to display the charging rate information, which may include the cost per kilowatt-hour, idle fees, and any other relevant pricing details that users need to be aware of before making a reservation. This transparency in pricing helps users to make informed decisions based on the cost of charging at different times or locations.

Figure 11:
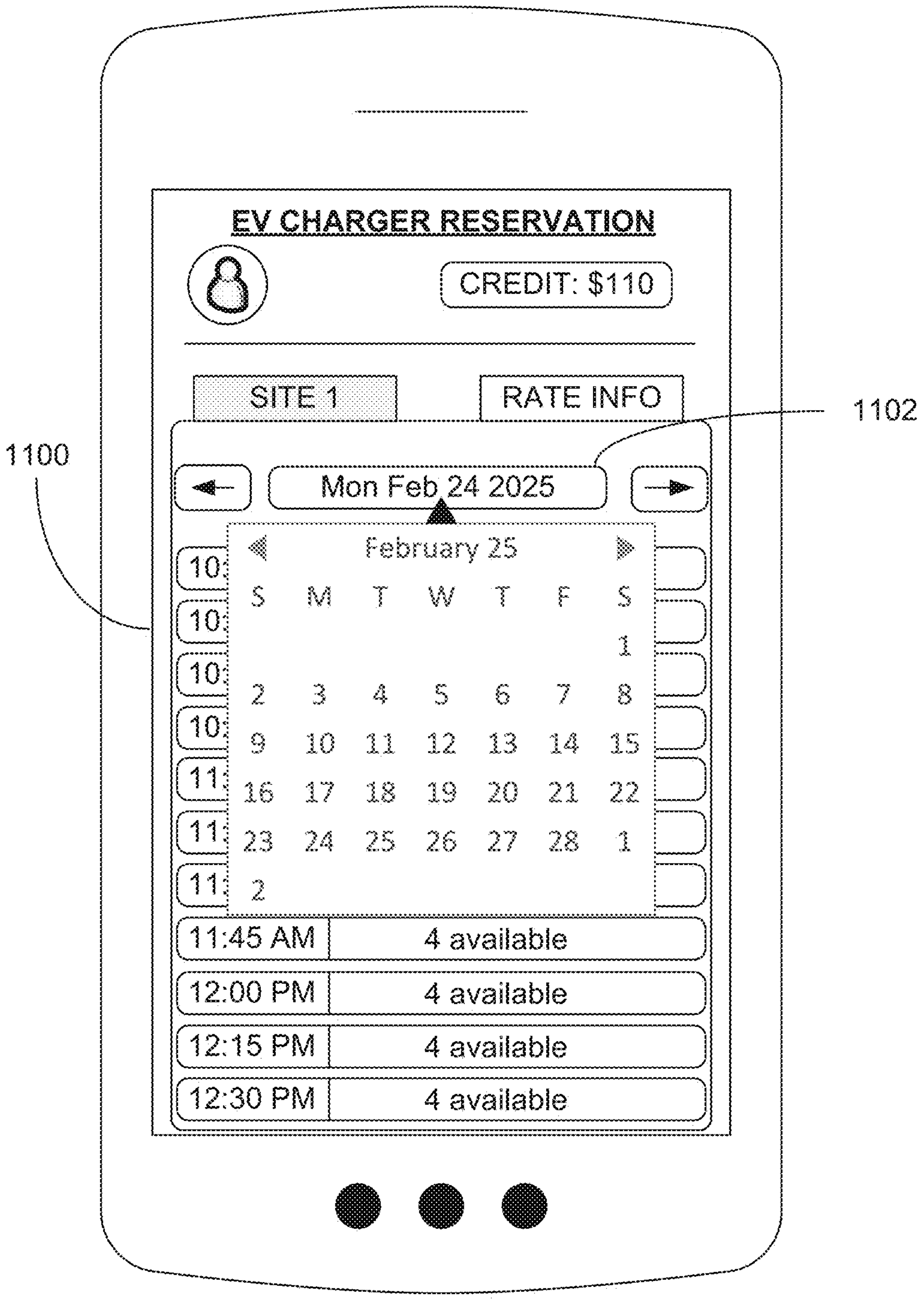

The scheduling user interface 1000 incorporates a UI element that allows end-users to select a day of the month for their charging session. As depicted in FIG. 11, when this UI element 1102 is interacted with, a calendar widget is presented, enabling the end-user to navigate through a calendar to select a specific month and day. In some examples, to enhance user convenience and efficiency, the calendar widget is designed to change the color of the dates based on the availability of the chargers. This visual cue allows users to easily identify available days without the need to click through multiple dates, streamlining the process of planning future trips or scheduling charging sessions well in advance. This functionality ensures that users can quickly and effortlessly reserve an EV charging station on the date of their choice, further enhancing the user experience and convenience offered by the EV charger scheduling service.

Figure 12:
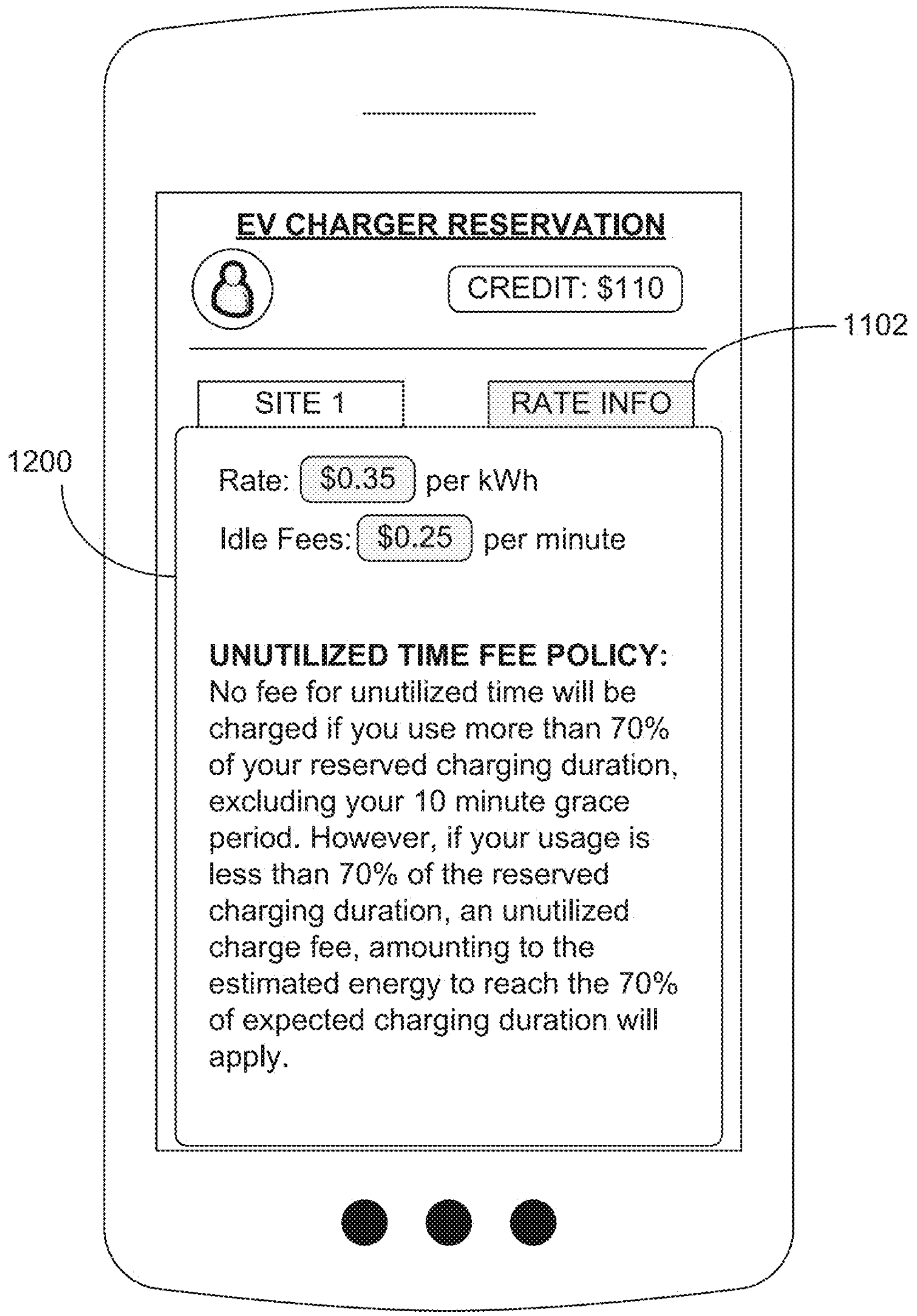

FIG. 12 showcases the user interface 1200 for presenting the rate information for a chosen location and EV charging station, which is presented to the end-user following the selection of the "Rate Info" tab 1102. This action triggers an update to the interface 1200, providing the end-user with detailed pricing information for the EV charging station at the specified location, as indicated by the first tab labeled "SITE 1". The interface 1200 is designed to offer end-users a clear and concise breakdown of the costs associated with using the EV charging station, fostering transparency and enabling informed decision-making.

Within the user interface 1200, the rate information is prominently displayed, detailing the cost per kilowatt-hour for charging at the selected station. This rate allows users to understand the potential cost of their charging session, Additionally, the interface 1200 may include other pertinent fee information, such as any applicable idle fees that could be incurred if the EV remains connected to the charger beyond the reserved time slot, or beyond the provided grace period. These fees are designed to encourage timely turnover of the charging station and ensure availability for other users.

The user interface 1200 also provides a clear policy statement regarding unutilized time fees, which is an important consideration for users who may not utilize their entire reserved charging duration. For example, the policy may state that no fee for unutilized time will be charged if the user consumes more than a certain percentage of their reserved charging duration, excluding any grace period. Conversely, if the user's consumption falls below this threshold, an unutilized charge fee may apply, calculated based on the estimated energy required to reach the specified percentage of expected charging duration.

By integrating this rate information directly into the scheduling interface, the EV charger scheduling service ensures that end-users are not only able to reserve charging stations with ease but also have immediate access to all necessary cost information to plan and manage their charging sessions effectively. This level of detail and accessibility in the user interface underscores the scheduling service's commitment to user satisfaction and operational efficiency.

Figure 13:
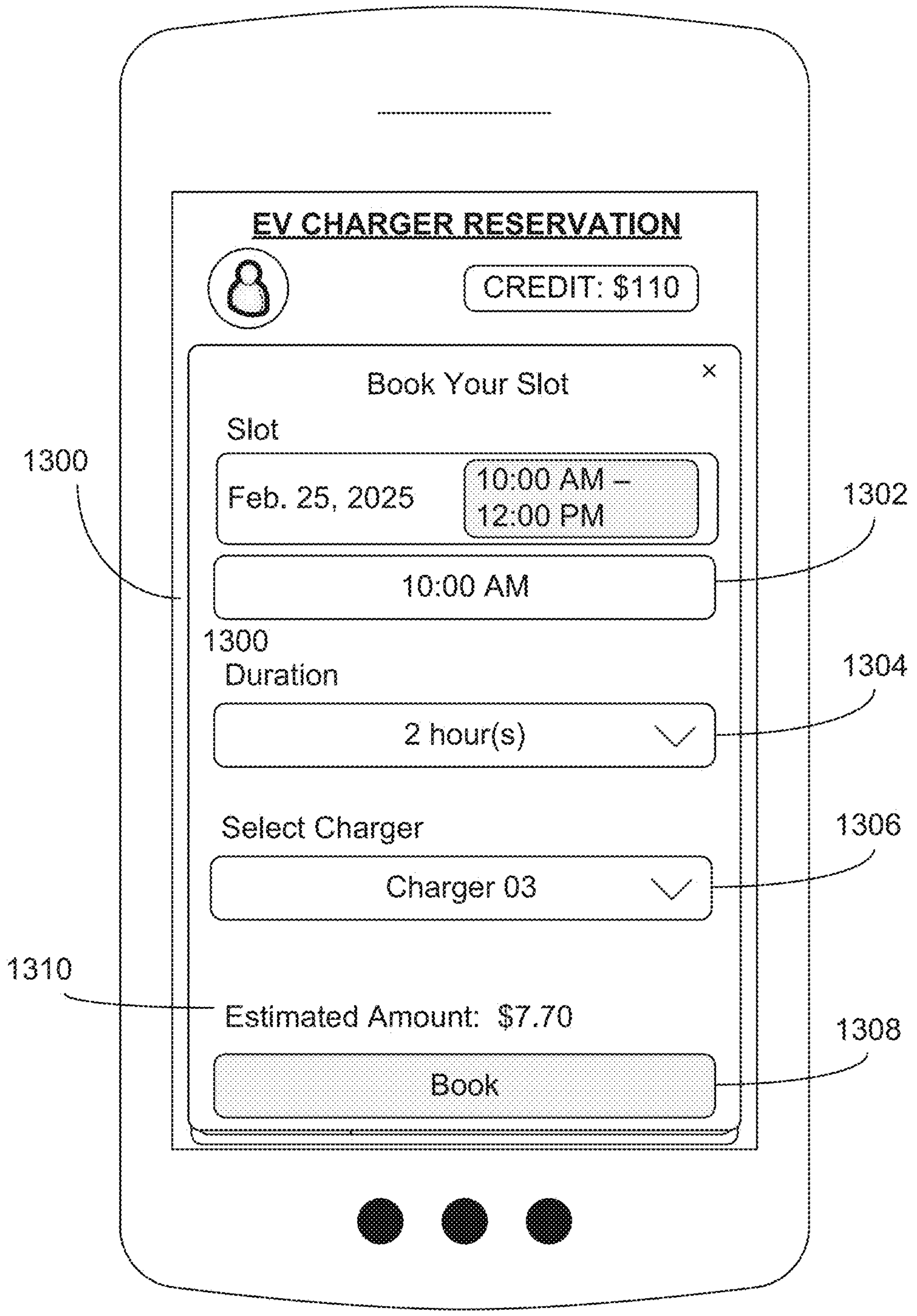

FIG. 13 presents a user interface 1300, which offers a detailed view of the scheduling interface for an EV charging session. This interface is designed to guide the end-user through the process of selecting a specific charging time slot, ensuring a seamless and intuitive experience. The user interface 1300 includes various interactive elements that facilitate the scheduling process. One such element is the duration selector 1304, which allows the end-user to specify the length of the charging session they wish to reserve. This could range from a brief top-up to a full charge, depending on the user's needs and the capabilities of the charging station. Typically, the various available durations are configured on a per location and/or per EV charger basis. Accordingly, different locations and different EV chargers may have different available durations to accommodate different use patterns.

Additionally, the interface 1300 includes a charger selector 1306, enabling the end-user to choose a specific charger from those available at the selected location. This feature is particularly useful in scenarios where multiple chargers with varying capabilities are present, and the end-user has a preference based on their vehicle's compatibility or charging speed requirements.

As the end-user interacts with these elements, the user interface dynamically updates to reflect the chosen parameters, including the precise period of time for the charging session. This real-time feedback ensures that the end-user is fully informed of their selections and can make any necessary adjustments before finalizing the reservation.

Once the end-user is satisfied with their selections, including the duration and specific charger, they are presented with an estimated amount for the charging session, as shown by reference 1310. This estimate accounts for the selected duration and the fee or rate associated with the chosen charger, providing a transparent cost expectation for the end-user.

To complete the reservation, the end-user is prompted to submit their request by selecting the button labeled "Book", with reference 1308. Upon selection, the client device 204 transmits the reservation details to the EV charger scheduling service 202, which then processes the request and confirms the reservation. The end-user is then provided with a confirmation of their scheduled charging session, completing the reservation process through the application. This streamlined approach to scheduling ensures that end-users can efficiently secure a charging slot that aligns with their individual charging needs and schedule.

Referring now again to FIG. 4, there is provided a flow diagram 400 illustrating the sequence of operations performed by various components within the EV charger scheduling system during an actual charging session. This process is initiated when an end-user arrives at the location of the EV charger and physically connects their EV to the connector of an EV charging station. At step 414, the EV charger detects the connection of an EV. This detection signifies that the physical interface between the EV and the charging station has been established, prompting the charger to initiate a communication protocol. The EV charger then sends a status update, as indicated by reference 414, through the charger management node 210 to the EV charger scheduling service 202. This status update includes data confirming the presence of an EV at the charging station and may contain additional information such as the identity of the EV, the specific connector being used, and the readiness of the EV to receive charge.

Upon receiving the status update, the scheduling service 202 proceeds to determine which user has reserved the identified charging station. This involves cross-referencing the received data with the scheduling service's reservation records to ascertain the correct user account associated with the current charging session.

Once the scheduling service 202 has identified the reserving user, it enables the charging session. Here, enabling the charging session is different from activating the charging session. By enabling the charging session, the scheduling service 202 communicates an instruction to the application on the client device of the end-user, enabling the user to start the charging session, as indicated by reference 420.

The user interface on the client device is updated to reflect the enabling of the charging session, typically by enabling a "Start Charging" control element. When the end-user interacts with this control element, a command is relayed back to the scheduling service 202, as indicated by reference 422. This command serves as an explicit instruction from the end-user to commence the charging process.

In response to the command from the end-user, the scheduling service 202 issues a relay command through the charger management node 210, as indicated by reference 424, to the EV charger. This relay command is a directive for the EV charger to activate the charging session and enable power delivery to the EV.

Upon receipt of the relay command, the EV charger enables power, as indicated by reference 426. This step involves the charger engaging its power delivery systems to begin charging the EV. The power delivery is managed according to the specifications of the charging session, which may include the duration of the charge, the rate of power delivery, the characteristics of the battery, and any other parameters set by the end-user or predefined by the scheduling service.

As indicated by the steps 428-A, 428-B, 428-C and 428-D, throughout the charging session, the scheduling service 202 maintains communication with the EV charger and the end-user's client device, ensuring that all components and parties are informed of the charging session's status. This includes providing real-time updates on the charging progress, managing any interruptions or modifications to the session, and ultimately concluding the session once the EV has been adequately charged or the reserved time slot has ended. The described system exemplifies a sophisticated integration of hardware and software components, working in concert to deliver a seamless and user-centric charging experience.

During the charging session, the EV charger continuously monitors the amount of power being delivered to the EV. This information is used by both the end-user and the scheduling service 202 to ensure that the charging process is proceeding as expected. As part of this monitoring, the EV charger records the cumulative energy supplied during the session, which is then communicated to the scheduling service 202 at regular intervals or upon specific events, such as the start or stop of charging.

The scheduling service 202 receives this power delivery data and processes it to maintain an accurate record of the charging session. This data includes not only the total kilowatt-hours (kWh) delivered but also the rate of power delivery, which may vary throughout the session due to various factors such as the EV's battery state or the charger's capabilities. The scheduling service 202 uses this information to calculate the cost of the session, monitor the charger's performance, and provide insights into the user's charging habits.

The user interface on the end-user's client device is updated to reflect this power delivery information, ensuring that the end-user has access to up-to-date data regarding their charging session. This update can manifest as a visual indicator on the interface, such as a progress bar or numerical display, which shows the amount of energy delivered and the estimated time remaining for the session. If the charging rate changes or if the session is paused or stopped, these changes are also reflected in the user interface, providing the end-user with a comprehensive view of the session's status.

By maintaining this flow of communication and updating the user interface accordingly, the scheduling service 202 ensures that the end-user remains fully informed and in control of their charging experience. This level of engagement not only enhances user satisfaction but also promotes efficient use of the charging infrastructure, as end-users can make informed decisions based on the real-time data provided.

Figure 14:
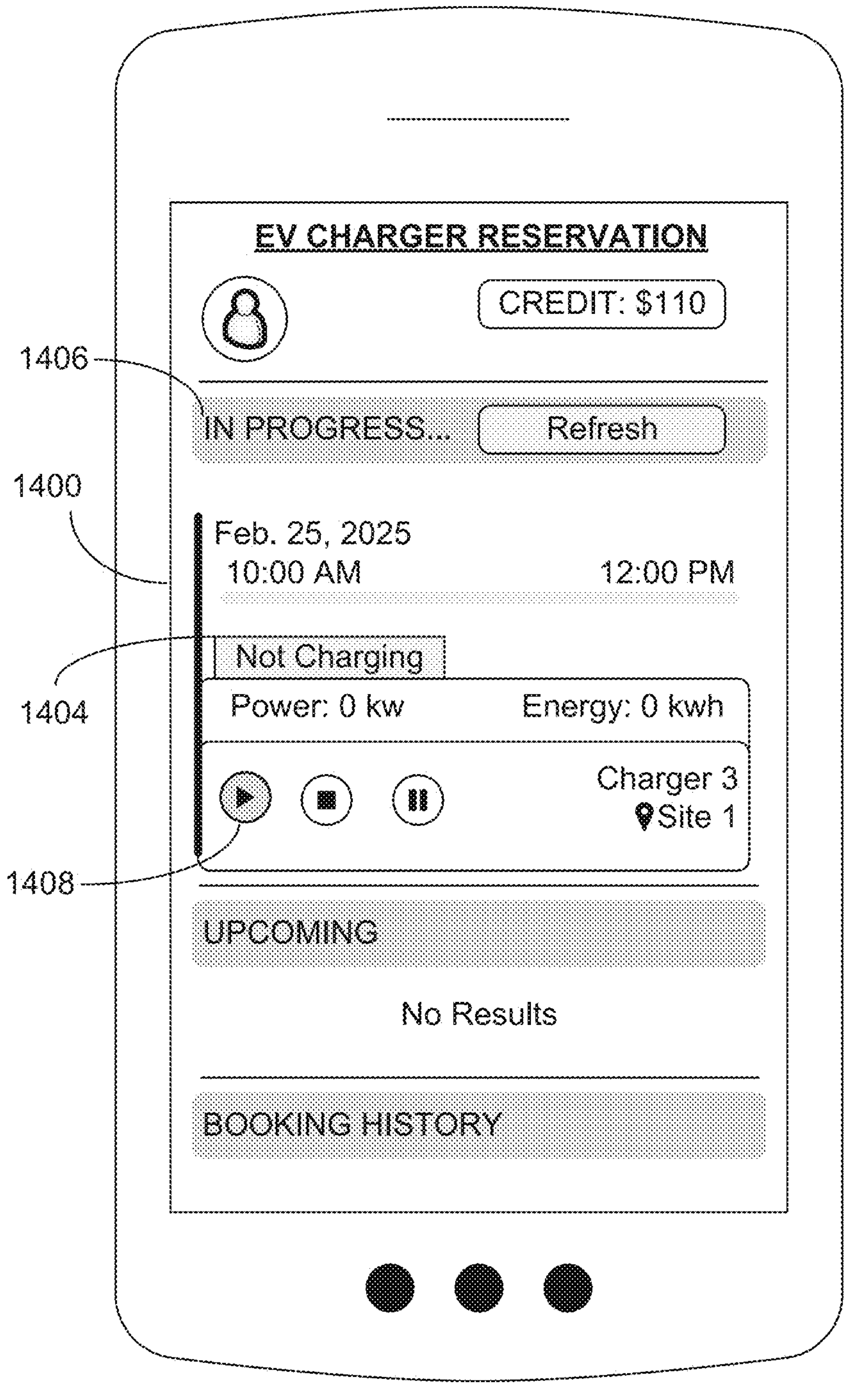

FIG. 14 illustrates a user interface 1400, which is displayed to the end-user during their reserved charging time slot. This interface 1400 provides real-time feedback on the status of the charging session, ensuring that the end-user is kept informed of the current state of their EV charging process. The user interface element with reference 1406 prominently indicates that a charging session is "IN PROGRESS . . . ", signifying that the reserved charging time slot is currently active. This visual cue alerts the end-user that the system is ready to deliver power to their EV once the physical connection between the EV and the charging station is established.

However, as shown by the user interface element with reference 1404, the EV is not charging at this moment. This could be due to several reasons, such as the EV not being connected to the charger, or the charging session not being initiated by the end-user. The interface 1400 displays "Not Charging" along with a power output of "0 kW" and energy delivery of "0 kWh", indicating that no power is being transferred to the EV.

Once the end-user connects their EV to the charge port, the charging station detects this connection and communicates a status update to the scheduling service. The scheduling service then updates the user interface 1400 accordingly. This update activates the "start charging" button, with reference 1408. Upon pressing this button 1408, the end-user effectively initiates the charging process.

The user interface 1400 is designed to transition smoothly from indicating a lack of charging activity to providing an interactive element for starting the charge. This ensures that the end-user has a clear and straightforward means of beginning their charging session without unnecessary complications. Once the "Start" button 1408 is pressed, the charging station begins delivering power to the EV, and the user interface will update to reflect the charging status, including the power output and energy delivered, providing the end-user with continuous updates throughout the charging session.

Figure 15:
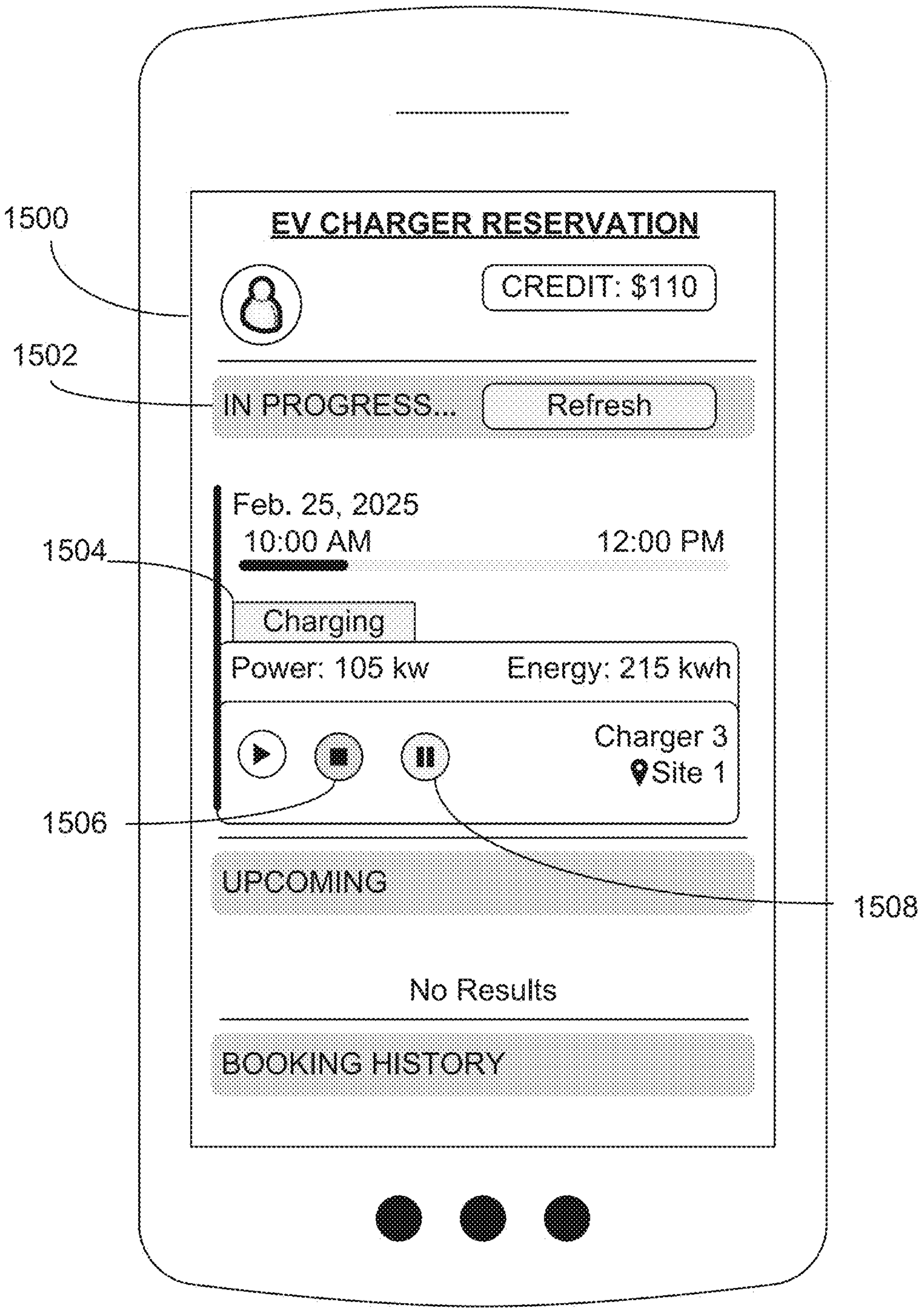

FIG. 15 depicts a user interface 1500, which is presented to the end-user when their EV is actively being charged. This interface provides the end-user with real-time information about the charging session and control over the charging process. The user interface element with reference 1504 indicates that the EV is currently "Charging", signifying that the charging station is actively delivering power to the EV. This status is accompanied by specific metrics such as the power output, shown as "105 kW", and the total energy delivered during the session, displayed as "215 kWh". These metrics offer the end-user a detailed view of the charging progress, allowing them to monitor the session effectively.

In addition to the charging status, the scheduling service 202 has updated the user interface of the application on the client device to include interactive controls for managing the charging session. As indicated by reference 1506 and 1508, the end-user is now provided with the option to either stop or pause the charging process. The presence of these controls gives the end-user flexibility and command over their charging session, enabling them to halt the charging process if necessary, for instance, if they need to drive their EV sooner than anticipated or wish to conserve power.

The "Stop" control 1506, when selected, will send a command to the scheduling service 202 to terminate the charging session. Similarly, the "Pause" control 1508 allows the end-user to temporarily suspend the charging process, with the option to resume it later by selecting a "Start" or "Resume" control, which would be enabled depending upon the charger status.

The user interface 1500 is designed to be intuitive and user-friendly, ensuring that the end-user can easily navigate and utilize the available controls without confusion. By providing these capabilities directly within the user interface, the EV charger scheduling service enhances the overall user experience, offering a high degree of control and convenience to the end-user during their charging sessions.

FIG. 4 illustrates the interactive process by which an end-user can terminate or pause a charging session through the user interface on their mobile device 204. This process is an integral part of the user's control over the charging experience, allowing them to conclude the charging session as needed.

The process begins at step 430 when the end-user is presented with a control element, typically a button, within the application, for example, executing on their mobile device 204 or via the EV software 208. This button is designed to be activated or enabled when the EV charger is actively delivering power to the EV. The activation of this button is a visual cue to the end-user that they have the option to stop the charging process at any time during the active session.

Upon deciding to end the charging session, the end-user selects the button designated for stopping the charge. This user action triggers the mobile application to communicate an instruction to the scheduling service 202, as indicated by reference 432. The instruction explicitly requests the deactivation or termination of the current charging session.

The scheduling service 202, upon receiving the stop instruction from the end-user's mobile application, proceeds to relay a command through the charger management node, as indicated by reference 434. This command node acts as an intermediary, ensuring that the command is securely and accurately transmitted to the EV charger.

When the EV charger receives the command to stop charging, as indicated at step 436, it executes a series of actions to safely terminate the power delivery to the EV. This involves disengaging the charging mechanism and ensuring that the EV is no longer receiving charge. The charger also sends a confirmation status update back through the management node to the scheduling service 202, which then updates the user interface on the mobile device 204 to reflect that the charging session has been concluded.

The user interface may also provide additional information post-termination, such as the total energy delivered during the session and any applicable fees for the used charging time. If the session is paused rather than stopped, the interface will offer the end-user the option to resume charging at a later time within their reserved time slot, maintaining the flexibility and convenience of the charging service.

This detailed process underscores the system's commitment to providing end-users with a responsive and user-centric charging service. By enabling end-users to have direct control over the start and stop of their charging sessions, the system enhances the overall user experience and ensures efficient management of the EV charging infrastructure.

In certain instances, the end-user may choose to terminate the charging session not through the application interface on their mobile device 204 but by physically disconnecting the EV from the charging station. This action involves the end-user manually pulling out the connector from the charge port of their EV and placing the connector back into the holder on the charging station.

When the physical disconnection occurs, the charging station is equipped with sensors that detect the removal of the connector. This detection triggers an automated process within the charging station's system to send a status update. The update is communicated through the charger management node to the scheduling service 202, indicating that the EV has been disconnected and that the charging session has been effectively terminated by the user.

Upon receiving this status update, the scheduling service 202 processes the information to confirm the end of the charging session. The service then executes a series of commands to update the application on the end-user's mobile device 204. These updates involve enabling or disabling various components of the user interface to reflect the current status of the charging station and the charging session.

For example, the user interface may deactivate the "Stop Charging" button since the session has already been terminated by the physical disconnection. Additionally, the interface may display a summary of the completed charging session, including the duration of the charge and the amount of energy delivered. If the charging station includes a feature for scheduling subsequent sessions, the interface may also prompt the end-user to reserve another time slot if needed.

The system is designed to handle both manual and digital termination of charging sessions seamlessly, ensuring that the end-user's experience is consistent and intuitive regardless of the method used. This flexibility in the operation of the charging session underscores the system's user-centric approach, providing convenience and control to the end-user while maintaining efficient management of the EV charging infrastructure.

In some examples, the scheduling service includes a point or credit system designed to gamify the end-user experience and promote positive behavior among end-users of EV charging stations that are configured for use with the scheduling service. This system is particularly focused on encouraging end-users to vacate parking spaces promptly at the conclusion of their charging sessions, thereby increasing the availability of charging stations for other users and improving overall service efficiency.

The point or credit system may operate by awarding points to end-users for desirable actions. For example, when an end-user confirms the conclusion of their charging session via the software application during a designated grace period, they are eligible to receive points. The grace period is a predetermined amount of time following the scheduled end of a charging session, during which the end-user is expected to disconnect their EV from the charging station and vacate the parking space.

To verify that the end-user has indeed vacated the space, the scheduling service may utilize location information. This information can be derived from the EV itself if it is equipped with connectivity features that allow location reporting, or from a GPS device integrated with the mobile computing device that executes the application through which the scheduling service is accessed.

Upon an end-user's confirmation of the charging session's conclusion, the scheduling service awaits a change in the location of the end-user's mobile device or EV. If the scheduling service receives data indicating that the end-user's location has changed in a manner consistent with the vacating of the parking space, points are then awarded to the end-user's account. This system ensures that points are granted not merely for the act of ending a charging session but for the actual physical act of making the charging station available for subsequent users.

In addition to the location-based confirmation of space vacancy, points may also be separately awarded when an end-user utilizes the software application to actively confirm the conclusion of a charging session. This is particularly beneficial in instances where the charging session is manually terminated early by the end-user. By confirming the early termination through the application, the end-user assists the scheduling service in promptly updating the schedule to reflect the newfound availability of the charging station. This proactive behavior by the end-user contributes to the efficient turnover of charging stations and ensures that the charging infrastructure is utilized to its fullest potential. Consequently, the scheduling service rewards such actions with points, as they directly lead to increased availability of charging stations for other end-users, enhancing the overall utility of the service.

The points accumulated by end-users serve as a virtual currency within the software application's ecosystem. As end-users accumulate points, they can redeem them for various rewards. For instance, a sufficient number of points may entitle the end-user to credits applicable to future charging sessions, reducing the cost of charging their EV. Alternatively, points could be used to gain priority access to charging stations, particularly during peak times, or to reserve charging stations at preferred locations.

The point system can be further expanded to include a variety of behaviors that benefit the charging station network and the end-user community. Examples of such behaviors include: reporting issues with charging stations, such as maintenance needs or safety concerns, which can help maintain the quality and reliability of the service; participating in community challenges, where end-users can earn points by achieving certain milestones, such as a number of consecutive days of charging exclusively at off-peak hours; and, engaging in energy-saving practices, like opting for slower charging speeds when time permits, which can help manage the load on the electrical grid.

The point system may be designed to be flexible and adaptable, allowing for the introduction of new behaviors to be rewarded as the service evolves. This gamification approach aims to create a community of engaged and responsible end-users who contribute to the efficient operation of the EV charging station network associated with the scheduling service. By implementing such a system, the scheduling service not only enhances the user experience but also fosters a culture of cooperation and consideration among EV owners, ultimately leading to a more efficient and user-friendly charging infrastructure.

The point system may also include a feature where, upon completion of a charging session, the user is prompted to take a photo of the connector properly placed back in its holder. This action not only encourages the user to responsibly return the connector, thereby maintaining the cleanliness and order of the charging station, but it also serves a dual purpose of enhancing the online profile of the charger. These photos can be uploaded to the charging station's profile, providing visual confirmation for future users about the charger's condition and exact location. This visual aid can be particularly helpful in large or crowded parking areas where identifying the specific charger might otherwise be challenging.

Furthermore, to foster a sense of community and promote the charging network, the point system may reward users who share their charging session completion on social media platforms. Upon finishing a charging session, users could be prompted by the application to share a post on their social media accounts, detailing their experience or simply noting the completion of their session. This post might include a hashtag specific to the charging network or a photo of the charging station. In return for promoting the charging service and contributing to its visibility, users would receive points added to their account. This strategy not only incentivizes users to engage with the service but also leverages user-generated content to enhance the service's marketing efforts, expanding its reach and potentially attracting new users to the network.

By integrating these interactive and community-oriented features into the point system, the scheduling service not only enhances user engagement but also improves the operational efficiency and public perception of the EV charging infrastructure. These gamification strategies ensure that users are not only consumers of the service but also active participants in the ecosystem, contributing to its upkeep and promotion.

The several figures presented herein, along with their corresponding descriptions, serve as illustrative examples of the disclosed technology. It is important to note that these examples are not exhaustive and are intended to demonstrate possible implementations of the EV charging station scheduling service. Variations in the order of operations, as well as modifications to the design and appearance of the user interfaces, are contemplated to be within the scope of the subject matter described herein. Such variations may include, but are not limited to, changes in the sequence of user interactions, adjustments in the graphical layout, and alterations in the functionality provided through the interfaces. These modifications are intended to accommodate different user preferences, technological capabilities, and operational requirements, ensuring that the system remains adaptable and effective across various use cases and environments. Consistent with any one embodiment, it is contemplated that any of the many variations of the user interfaces and the associated functionality may be configurable to operate on a per location, or per EV charger basis, such that different EV charging stations and different groups of EV charging stations can be configured to operate in related, but different ways.

In the disclosed embodiments of the EV charging station scheduling service, the process of reserving a charging session is designed to be both user-friendly and efficient. Consistent with some embodiments, after an end-user selects a preferred location and date or dates for charging their EV, the scheduling service presents the end-user with a selection of time slots for which at least one EV charging station is available. These time slots indicate when one or more EV chargers at the selected location are free for use. Upon the end-user selecting a desired time slot, the scheduling service then takes on the role of selecting and assigning an appropriate EV charging station or a specific connector, particularly in cases where a single charging station is equipped with multiple connectors.

The assignment of an EV charging station or connector can be handled in several ways. In some instances, the selection and assignment may be random, with the scheduling service choosing any available charger or connector that meets the basic requirements. This approach is straightforward and ensures quick assignment but does not account for specific preferences or optimal matching of EV and charger characteristics.

In scenarios where compatibility and efficiency are prioritized, the scheduling service may employ a filtering mechanism. This mechanism automatically excludes any chargers or connectors that do not match the specifications of the end-user's EV, such as connector type or power requirements. For example, if an EV requires a CCS connector or an NACS, the scheduling service will only consider EV charging stations that offer this type of connection.

Further refining the process, the scheduling service might prioritize the assignment of EV chargers based on various characteristics of the EV charging stations or individual connectors. This could involve prioritizing EV chargers based on their charging speed, the physical ease of access, or even their current operational status. For instance, an EV charger located closer to the entrance of a parking lot might be prioritized for users who have indicated a preference for convenience.

In more sophisticated implementations, the scheduling service utilizes a matching algorithm designed to select the "best" EV charger and connector based on a detailed comparison of the characteristics of the EV and the available EV charging stations. This algorithm considers factors such as the charging speed supported by the EV, the physical connector type, and even the historical reliability of the charging stations. By doing so, the system aims to optimize the charging experience, ensuring that the EV is charged efficiently and effectively according to the specific needs and capabilities of both the vehicle and the charging infrastructure.

Each of these methods offers different advantages and can be selected based on the specific requirements of the charging network, the preferences of the end-user, or the operational strategies of the service provider. These varied approaches demonstrate the flexibility and adaptability of the scheduling service, catering to a wide range of scenarios and user needs.

In some alternative embodiments of the EV charging station scheduling service, the process of selecting a charging session is further enhanced to provide end-users with greater control and information. After an end-user specifies a desired location and a date or range of dates for charging their EV, end-user may select a desired time slot based on their availability. Instead of the scheduling service automatically assigning an EV charging station or connector, the scheduling service may take a more interactive approach by identifying all available and compatible EV charging stations and/or connectors for the specified time slot.

Upon selecting the time slot, the scheduling service generates a list of all compatible EV charging stations available during that selected time slot or time period. This list is presented via the client software application to the end-user, who can then make an informed choice based on detailed information about each option. To streamline this selection process, the scheduling service may employ various methods to prioritize and order the presentation of EV chargers and connectors when presenting them via the user interface.

- Filtering Incompatible Options: Initially, the scheduling service or system may filter out any EV chargers and connectors that are not compatible with the end-user's EV, based on the EV profile which includes details like connector type and power requirements, and in some instances, explicit end-user preferences including, for example, desired parking spot characteristics. This ensures that the end-user only views chargers that can physically and electrically support their vehicle. By way of example, an end-user who is towing a trailer may specify a preference for a pull through space, so that the end-user need not have to back-up and back out of a parking space.

Random Presentation: In simpler implementations, the available and compatible chargers may be presented randomly. This method is straightforward but does not account for user preferences or optimal charger allocation strategies.

Ordering by Charger Characteristics: With some embodiments, the system may order the presentation of available EV chargers based on specific characteristics of the chargers, such as power delivery capacity. For example, chargers that offer faster charging speeds might be listed first to appeal to users who prioritize quick charging times.

Matching Algorithm: In some implementations, the presentation of chargers is governed by a matching algorithm that considers both the characteristics of the EV chargers and explicit preferences set by the end-user. Versions of this type of algorithm might prioritize chargers based on proximity, lower usage rates, or even environmental factors like solar availability if the charger is solar-powered.

With respect to those embodiments that use a matching algorithm, various algorithms may be used to determine the extent to which an EV charger is considered a "match" for a particular EV. For example, a matching algorithm may be designed to handle a variety of characteristics, each potentially weighted differently to reflect their importance in the charging process. These characteristics might include connector type, power delivery capacity, charging speed, characteristics of the parking space and its proximity to the EV charger (e.g., pull through spots versus those requiring an EV to be backed in), and proximity to the user's location.

Connector type may be an important characteristic in matching EVs with charging stations, but the consideration of connector adapters adds a layer of flexibility to this process. While an exact match between the EV's native connector and the charging station's connector is ideal, the availability of adapters, either provided by the charging station or owned by the end-user, expands the range of compatible options. For instance, an EV with a CCS connector might be able to use a charging station with a NACS connector if the appropriate adapter is available.

Power delivery, on the other hand, is typically specified as a range rather than an exact number, allowing for greater flexibility in matching. For example, if an EV can accept a charging power between 50 kW and 150 KW, the algorithm prioritizes chargers within this range. However, it may also consider chargers with slightly lower or higher capacities if they offer other beneficial features, such as proximity, lower usage rates, or the availability of compatible adapters. This approach ensures that the matching process takes into account both the technical requirements of the EV and practical considerations that enhance the overall charging experience.

The matching algorithm can be configured to factor in the availability of adapters when assessing compatibility. If an end-user's profile indicates ownership of specific adapters, or if the charging station provides adapters on-site, the system can include these options in the matching process. This expanded compatibility assessment allows for a more comprehensive and user-friendly charging solution, potentially increasing the number of suitable charging options for each end-user while still ensuring safe and efficient charging.

The matching process can also incorporate rules-based matching for certain characteristics. For example, while connector type might need an exact match, the algorithm could use a rule that allows for a "close enough" match in terms of power delivery, especially if an EV charger offers a faster charging speed than required, which could be advantageous to the user.

With some embodiments, the user interface elements that represent each selectable, available EV charger are designed to convey information about the matching characteristics effectively. This information might be displayed as text describing each characteristic, icons that visually represent features like power type or speed, or even through color coding. For instance, different shades of green could indicate how well a charger matches the EV's requirements and user preferences, with a darker shade representing a higher compatibility score.

EV chargers with higher matching scores may be presented more prominently (e.g., top of the list) when displayed in a group. Additionally, a numerical matching score might be presented alongside each charger option. This score quantifies the level of match between the EV's requirements and the charger's characteristics, providing a straightforward metric that users can use to compare options quickly. The score could be calculated based on the weighted importance of each characteristic, giving users a clear indication of which chargers are likely to provide the most efficient and effective charging experience based on their specific needs and preferences.

Through these sophisticated matching and presentation techniques, the scheduling service not only simplifies the selection process for end-users but also enhances their experience by ensuring that they can make informed decisions with ease, leading to a more satisfactory and efficient charging session.

When presenting the list of available EV chargers, the scheduling service provides concise yet comprehensive information about each option. This might include the charger's power output, the type of connector, its location within the charging site, and its current operational status. For users requiring more detailed information, there may be an option to select a charger to view full details. This detailed view could include a map pinpointing the charger's exact location relative to other available and unavailable chargers, helping users choose a charger that offers not only technical compatibility but also practical convenience, such as being away from heavily used areas.

Additionally, the user interface may include interactive elements such as buttons or links that allow the end-user to reserve a specific charger directly from the detailed view of an EV charger. This functionality enhances user experience by enabling direct action once the user has all the necessary information.

For example, consider an end-user who drives an EV that requires a NACS connector and prefers to charge at stations offering at least 50 kW power. Upon entering their preferences and selecting a time slot, they are presented with a list of chargers that match these criteria. Each listing includes a brief summary of the charger's features and a detailed view option. The user selects a charger located on the periphery of a parking lot, which is less crowded, ensuring ease of access and reduced waiting times.

Consistent with some embodiments, the EV charging station scheduling service offers enhanced flexibility and convenience for end-users by providing location-agnostic time slot selection and intelligent nearby charger recommendations. These features are designed to streamline the charging process and maximize the utilization of available charging infrastructure.

In certain implementations, the system may prompt the end-user to select a time slot without first specifying a location. Upon selecting a desired time slot, the scheduling service leverages the GPS capabilities of the user's device to determine their current location. The system then generates and presents a list of available EV chargers in close proximity to the user's current position. This approach is particularly beneficial for users who are on the move or unfamiliar with charging options in their immediate vicinity.

Alternatively, the scheduling service may utilize previously saved location data associated with the end-user's profile to suggest relevant charging options. This could include locations marked as the user's residence, place of employment, or other frequently visited or favorite locations. By referencing this historical data, the system can offer personalized charging recommendations that align with the user's typical routines and preferences.

The user interface for this feature might present a simple time slot selection screen, followed by a map view or list of nearby available chargers. Each charger listing would include essential information such as distance from the user's current location, charging speed, and connector type. Users could then easily compare options and select the most convenient charger for their needs.

In scenarios where an end-user specifies a location and time slot but finds no available chargers, the scheduling service employs an intelligent recommendation system. This system searches for available EV chargers within a predetermined radius of the user's specified location. If a suitable alternative is found, the system presents this option to the user, potentially saving them time and reducing the likelihood of unsuccessful charging attempts.

Consistent with some embodiments, to facilitate this nearby charger search functionality, end-users have the option to establish preferences within their user profile. These preferences may include toggles to enable or disable the nearby charger search feature, as well as the ability to set a maximum search radius. For instance, a user might specify that they are willing to consider alternative charging locations within a 5-mile radius of their originally selected location.

The back-end scheduling service performs these operations through a series of database queries and geospatial calculations. When searching for nearby chargers, the system first determines the geographic coordinates of the user's specified location or current position. It then queries the database of EV chargers, applying filters for availability during the selected time slot and calculating the distance between each charger and the reference point. Chargers falling within the specified radius (either system default or user-defined) are returned and ranked based on proximity and other relevant factors such as charging speed or user preferences.

To enhance user experience, the interface for setting these preferences could be integrated into the user's profile settings. A simple toggle switch could enable or disable the nearby charger search feature, while a slider or dropdown menu could allow users to set their preferred maximum search distance. These settings would then be stored in the user's profile and referenced each time they interact with the scheduling service.

By implementing these features, the EV charging station scheduling service not only provides users with greater flexibility in planning their charging sessions but also helps optimize the utilization of the charging network as a whole. This approach can lead to improved user satisfaction and more efficient use of charging infrastructure, ultimately contributing to the broader adoption of electric vehicles.

EXAMPLES

In view of the disclosure above, various examples are set forth below. It should be noted that one or more features of an example, taken in isolation or combination, should be considered within the disclosure of this application.

Example 1 is a computer-implemented method for scheduling an electric vehicle (EV) charging session by an EV charger scheduling service, the computer-implemented method comprising: causing a user interface of a software application to be presented on a display of a client computing device, the user interface presenting a plurality of time slots for scheduling the EV charging session and prompting an end-user for selection of a time slot from the plurality of time slots, each time slot associated with one or more EV chargers available during a period of time indicated by the time slot; receiving over a network and from the software application an indication of a selected time slot for the EV charging session; based on the selected time slot for the EV charging session, identifying a first EV charger from the one or more EV chargers available during the period of time indicated by the selected time slot; updating a data record associated with the first EV charger to reflect that the first EV charger has been reserved for the end-user during the period of time indicated by the selected time slot; during the period of time indicated by the selected time slot: receiving over a network an indication from the first EV charger that an EV is connected to the first EV charger via a charge port of the EV; in response to receiving the indication from the first EV charger that the EV is connected to the first EV charger, causing a user interface of the software application to be updated with a user interface control element, which, when selected by the end-user, causes the software application to send an instruction to the EV charger scheduling service, the instruction directing the EV charger scheduling service to activate the first EV charger to provide power to charge the EV; and in response to receiving the instruction, communicating, over a network, a first command to the first EV charger, the first command instructing the first EV charger to provide power to a connector of the first EV charger to charge the EV.

In Example 2, the subject matter of Example 1 includes, wherein identifying a first EV charger from the one or more EV chargers available during the period of time indicated by the selected time slot further comprises: randomly selecting the first EV charger from the one or more EV chargers; selecting the first EV charger based on a priority scheme, wherein an EV charger is selected according to a set of prioritized characteristics of the one or more EV chargers available for the selected time slot; or selecting the first EV charger based on the first EV charger having the highest number of matching EV charger characteristics with characteristics of the EV of the end-user, including both inherent characteristics of the EV and preferences explicitly set by the end-user.

In Example 3, the subject matter of Examples 1-2 includes, wherein causing the user interface of the software application to be presented on the display of the client computing device further comprises: displaying a selection interface that includes, for each time slot in the plurality of time slots, a selectable user interface element representing the time slot, each selectable user interface element indicating the period of time for which an EV charging session is to be reserved, wherein the period of time represented by each time slot is configurable via the EV charger scheduling service on a per location basis or on a per EV charger basis.

In Example 4, the subject matter of Examples 1-3 includes, wherein the EV charger scheduling service is configured to enable an administrator to set a duration of a grace period on a per location basis or a per EV charger basis, the grace period representing a duration of time at the end of a scheduled charging session during which power is not provided to a connector of an EV charger, and wherein the EV charger scheduling service is further configured to communicate the commencement of the grace period to the software application of the end-user.

In Example 5, the subject matter of Examples 1-4 includes, sending a notification to the software application of the end-user if the EV charger scheduling service receives a status update from the first EV charger indicating the EV is disconnected from the first EV charger before the end of the period of time associated with the selected time slot, the notification prompting the end-user to confirm an early termination of the EV charging session.

In Example 6, the subject matter of Examples 1-5 includes, wherein upon receiving an update from the first EV charger indicating a change in status due to the EV of the end-user being disconnected from the connector during an enabled charging session, causing an update to be presented via a user interface on the software application of the end-user associated with the enabled session, the update prompting the end-user to confirm whether the EV charging session should be terminated; and if the end-user confirms termination, updating the data record associated with the first EV charger to reflect that the first EV charger is available for scheduling by other end-users.

In Example 7, the subject matter of Examples 1-6 includes, wherein the EV charger scheduling service is configured to receive a location code inputted by an end-user, the location code corresponding to a private EV charger, and in response to receiving the location code, the EV charger scheduling service updates a data record associated with the private EV charger to grant access to the end-user via the software application, thereby enabling the end-user to schedule charging sessions at the private EV charger.

In Example 8, the subject matter of Examples 1-7 includes, updating an end-user account of the end-user by adding points to a stored wallet or credit banking system within the software application when the end-user confirms, via the user interface of the software application of the client computing device, the EV charging session has concluded prior to the end of a grace period, and wherein the software application is further configured to report a change in location of the client computing device, indicating that the EV has departed from the location of the EV charger before the conclusion of the grace period, thereby triggering an addition of points to the end-user's account as a reward for vacating a charging space in a timely manner.

Example 9 is a system for scheduling an electric vehicle (EV) charging session, the system comprising: one or more processors; one or more memory storage devices storing instructions thereon, which, when executed by the one or more processors, cause the system to perform operations comprising: causing a user interface of a software application to be presented on a display of a client computing device, the user interface presenting a plurality of time slots for scheduling the EV charging session and prompting an end-user for selection of a time slot from the plurality of time slots, each time slot associated with one or more EV chargers available during a period of time indicated by the time slot; receiving over a network and from the software application an indication of a selected time slot for the EV charging session; based on the selected time slot for the EV charging session, identifying a first EV charger from the one or more EV chargers available during the period of time indicated by the selected time slot; updating a data record associated with the first EV charger to reflect that the first EV charger has been reserved for the end-user during the period of time indicated by the selected time slot; during the period of time indicated by the selected time slot: receiving over a network an indication from the first EV charger that an EV is connected to the first EV charger via a charge port of the EV; in response to receiving the indication from the first EV charger that the EV is connected to the first EV charger, causing a user interface of the software application to be updated with a user interface control element, which, when selected by the end-user, causes the software application to send an instruction to the system, the instruction directing the system to activate the first EV charger to provide power to charge the EV; and in response to receiving the instruction, communicating, over a network, a first command to the first EV charger, the first command instructing the first EV charger to provide power to a connector of the first EV charger to charge the EV.

In Example 10, the subject matter of Example 9 includes, wherein identifying a first EV charger from the one or more EV chargers available during the period of time indicated by the selected time slot further comprises: randomly selecting the first EV charger from the one or more EV chargers; selecting the first EV charger based on a priority scheme, wherein an EV charger is selected according to a set of prioritized characteristics of the one or more EV chargers available for the selected time slot; or selecting the first EV charger based on the first EV charger having the highest number of matching EV charger characteristics with characteristics of the EV of the end-user, including both inherent characteristics of the EV and preferences explicitly set by the end-user.

In Example 11, the subject matter of Example 10 includes, wherein causing the user interface of the software application to be presented on the display of the client computing device further comprises: displaying a selection interface that includes, for each time slot in the plurality of time slots, a selectable user interface element representing the time slot, each selectable user interface element indicating the period of time for which an EV charging session is to be reserved, wherein the period of time represented by each time slot is configurable via the system on a per location basis or on a per EV charger basis.

In Example 12, the subject matter of Examples 9-11 includes, wherein the scheduling service is configured to enable an administrator to set a duration of a grace period on a per location basis or a per EV charger basis, the grace period representing a duration of time at the end of a scheduled charging session during which power is not provided to a connector of an EV charger, and wherein the EV charger scheduling service is further configured to communicate the commencement of the grace period to the software application of the end-user.

In Example 13, the subject matter of Examples 9-12 includes, wherein the instructions, when executed by the one or more processors, cause the system to perform operations comprising: sending a notification to the software application of the end-user if the scheduling service receives a status update from the first EV charger indicating the EV is disconnected from the first EV charger before the end of the period of time associated with the selected time slot, the notification prompting the end-user to confirm an early termination of the EV charging session.

In Example 14, the subject matter of Examples 9-13 includes, wherein the instructions, when executed by the one or more processors, cause the system to perform operations comprising: upon receiving an update from the first EV charger indicating a change in status due to the EV of the end-user being disconnected from the connector during an enabled charging session, causing an update to be presented via a user interface on the software application of the end-user associated with the enabled session, the update prompting the end-user to confirm whether the EV charging session should be terminated; and if the end-user confirms termination, updating the data record associated with the first EV charger to reflect that the first EV charger is available for scheduling by other end-users.

In Example 15, the subject matter of Examples 9-14 includes, wherein the system is configured to receive a location code inputted by an end-user, the location code corresponding to a private EV charger, and in response to receiving the location code, the system updates a data record associated with the private EV charger to grant access to the end-user via the software application, thereby enabling the end-user to schedule charging sessions at the private EV charger.

In Example 16, the subject matter of Examples 9-15 includes, updating an end-user account of the end-user by adding points to a stored wallet or credit banking system within the software application when the end-user confirms, via the user interface of the software application of the client computing device, the EV charging session has concluded prior to the end of a grace period, and wherein the software application is further configured to report a change in location of the client computing device, indicating that the EV has departed from the location of the EV charger before the conclusion of the grace period, thereby triggering an addition of points to the end-user's account as a reward for vacating a charging space in a timely manner.

Example 17 is a computer-implemented method for scheduling an electric vehicle (EV) charging session by an EV charger scheduling service, the computer-implemented method comprising: causing a user interface of a software application to be presented on a display of a client computing device, the user interface presenting a plurality of time slots, each time slot indicating a period of time during which EV charging is available; receiving over a network and from the software application an indication of a selected time slot for the EV charging session; in response to detecting the selection of a time slot, presenting a user interface that displays a user interface element for each EV charger available during the period of time associated with the selected time slot, thereby enabling the end-user to view and select from the available EV chargers; detecting selection of a specific EV charger from the presented user interface elements, each associated with an available EV charger during the selected time slot; updating a data record associated with the selected specific EV charger to reflect that the EV charger has been reserved for the end-user during the period of time indicated by the selected time slot; during the period of time indicated by the selected time slot: receiving over a network an indication from the selected specific EV charger that an EV is connected to the EV charger via a charge port of the EV; in response to receiving the indication from the selected specific EV charger that the EV is connected to the EV charger, causing a user interface of the software application to be updated with a user interface control element, which, when selected by the end-user, causes the software application to send an instruction to the EV charger scheduling service, the instruction directing the EV charger scheduling service to activate the selected specific EV charger to provide power to charge the EV; and in response to receiving the instruction, communicating, over a network, a first command to the selected specific EV charger, the first command instructing the EV charger to provide power to a connector of the EV charger to charge the EV.

In Example 18, the subject matter of Example 17 includes, wherein presenting a user interface that displays a user interface element for each EV charger available during the period of time associated with the selected time slot, further comprises: determining the order of the user interface elements presented by: randomly ordering the user interface elements; ordering the user interface elements based on specific characteristics of the EV chargers; or ordering the user interface elements according to matching scores, which are determined by applying a rule-based scoring system that evaluates the extent to which characteristics of each EV charger match the desired end-user preferences and EV characteristics.

Example 19 is a system for scheduling an electric vehicle (EV) charging session, the system comprising: one or more processors; one or more memory storage devices storing instructions thereon, which, when executed by the one or more processors, cause the system to perform operations comprising: causing a user interface of a software application to be presented on a display of a client computing device, the user interface presenting a plurality of time slots, each time slot indicating a period of time during which EV charging is available; receiving over a network and from the software application an indication of a selected time slot for the EV charging session; in response to detecting the selection of a time slot, presenting a user interface that displays a user interface element for each EV charger available during the period of time associated with the selected time slot, thereby enabling the end-user to view and select from the available EV chargers; detecting selection of a specific EV charger from the presented user interface elements, each associated with an available EV charger during the selected time slot; updating a data record associated with the selected specific EV charger to reflect that the EV charger has been reserved for the end-user during the period of time indicated by the selected time slot; during the period of time indicated by the selected time slot: receiving over a network an indication from the selected specific EV charger that an EV is connected to the EV charger via a charge port of the EV; in response to receiving the indication from the selected specific EV charger that the EV is connected to the EV charger, causing a user interface of the software application to be updated with a user interface control element, which, when selected by the end-user, causes the software application to send an instruction to the system, the instruction directing the EV charger scheduling service to activate the selected specific EV charger to provide power to charge the EV; and in response to receiving the instruction, communicating, over a network, a first command to the selected specific EV charger, the first command instructing the EV charger to provide power to a connector of the EV charger to charge the EV.

In Example 20, the subject matter of Example 19 includes, wherein presenting a user interface that displays a user interface element for each EV charger available during the period of time associated with the selected time slot, further comprises: determining the order of the user interface elements presented by: randomly ordering the user interface elements; ordering the user interface elements based on specific characteristics of the EV chargers; or ordering the user interface elements according to matching scores, which are determined by applying a rule-based scoring system that evaluates the extent to which characteristics of each EV charger match the desired end-user preferences and EV characteristics.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Software Architecture and Machine

Figure 16:
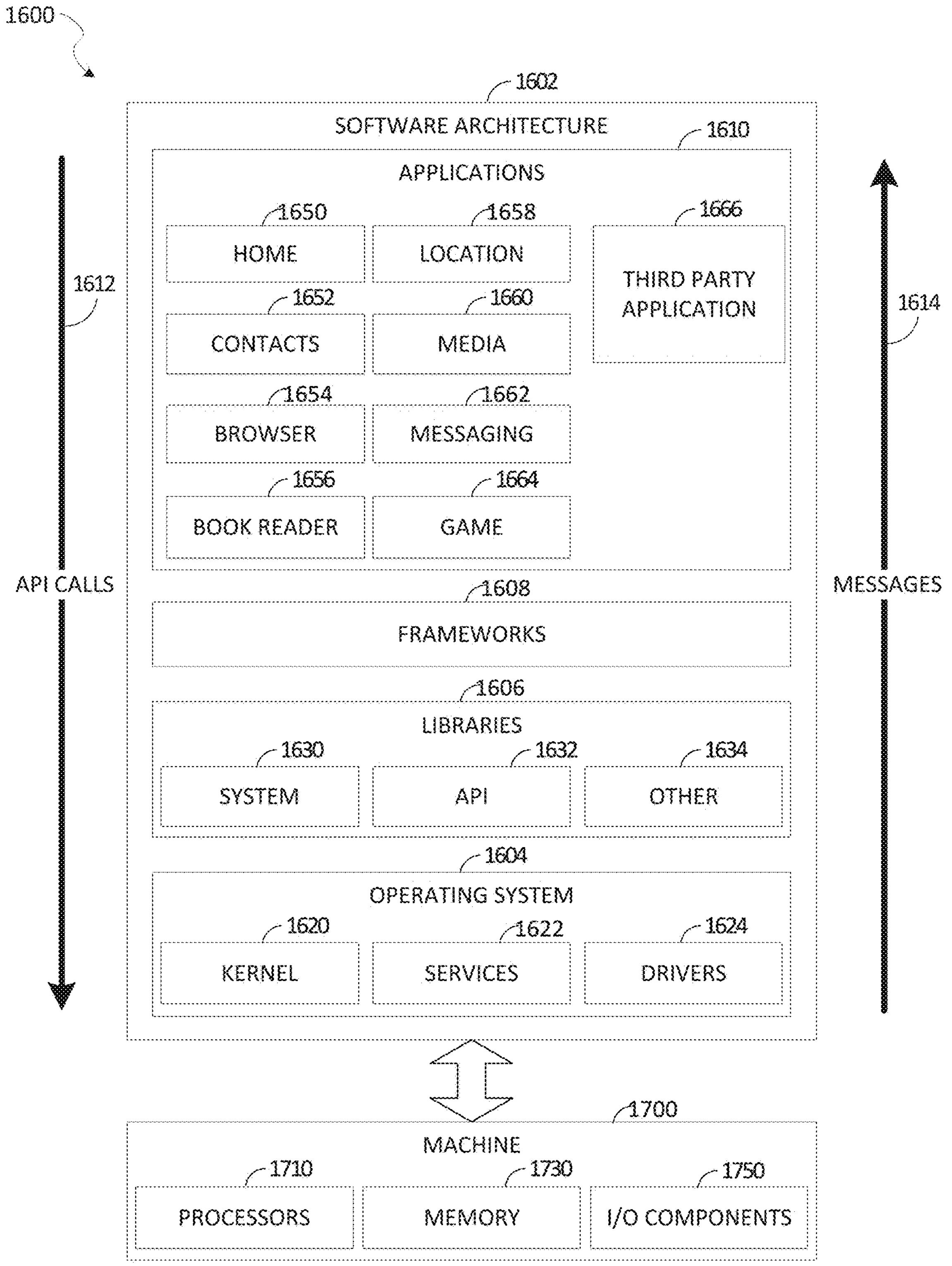
FIG. 16 is a block diagram illustrating an architecture of software, which can be installed on any one or more of the devices described above.

FIG. 16 is a block diagram 1600 illustrating software architecture 1602, which can be installed on any one or more of the devices described above. FIG. 16 is merely a non-limiting example of a software architecture, and it will be appreciated that many other architectures can be implemented to facilitate the functionality described herein. In various embodiments, the software architecture 1602 is implemented by hardware such as a machine 1700 of FIG. 17 which, includes processors 1710, memory 1730, and input/output (I/O) components 1750. In this example architecture, the software architecture 1602 can be conceptualized as a stack of layers where each layer may provide a particular functionality. For example, the software architecture 1602 includes layers such as an operating system 1604, libraries 1606, frameworks 1608, and applications 1610. Operationally, the applications 1610 invoke API calls 1612 through the software stack and receive messages 1614 in response to the API calls 1612, consistent with some examples.

In various implementations, the operating system 1604 manages hardware resources and provides an EV charging station resources reservation arrangement. The operating system 1604 includes, for example, a kernel 1620, services 1622, and drivers 1624. The kernel 1620 acts as an abstraction layer between the hardware and the other software layers, consistent with some examples. For example, the kernel 1620 provides memory management, processor management (e.g., scheduling), component management, networking, and security settings, among other functionalities. The services 1622 can provide other common services for the other software layers. The drivers 1624 are responsible for controlling or interfacing with the underlying hardware, according to some examples. For instance, the drivers 1624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some examples, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some examples. For example, the frameworks 1608 provide various graphical user interface functions, high-level resource management, high-level location services, and so forth. The frameworks 1608 can provide a broad spectrum of other APIs that can be utilized by the applications 1610, some of which may be specific to a particular operating system 1604 or platform.

In an example, the applications 1610 include a home application 1650 (e.g., an application to reserve an EV charging station), a contacts application 1652, a browser application 1654, a book reader application 1656, a location application 1658, a media application 1660, a messaging application 562, a game application 1664, and a broad assortment of other applications, such as a third-party application 1666. According to some embodiments, the applications 1610 are programs that execute functions defined in the programs. Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third-party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1666 can invoke the API calls 1612 provided by the operating system 1604 to facilitate functionality described herein.

Figure 17:
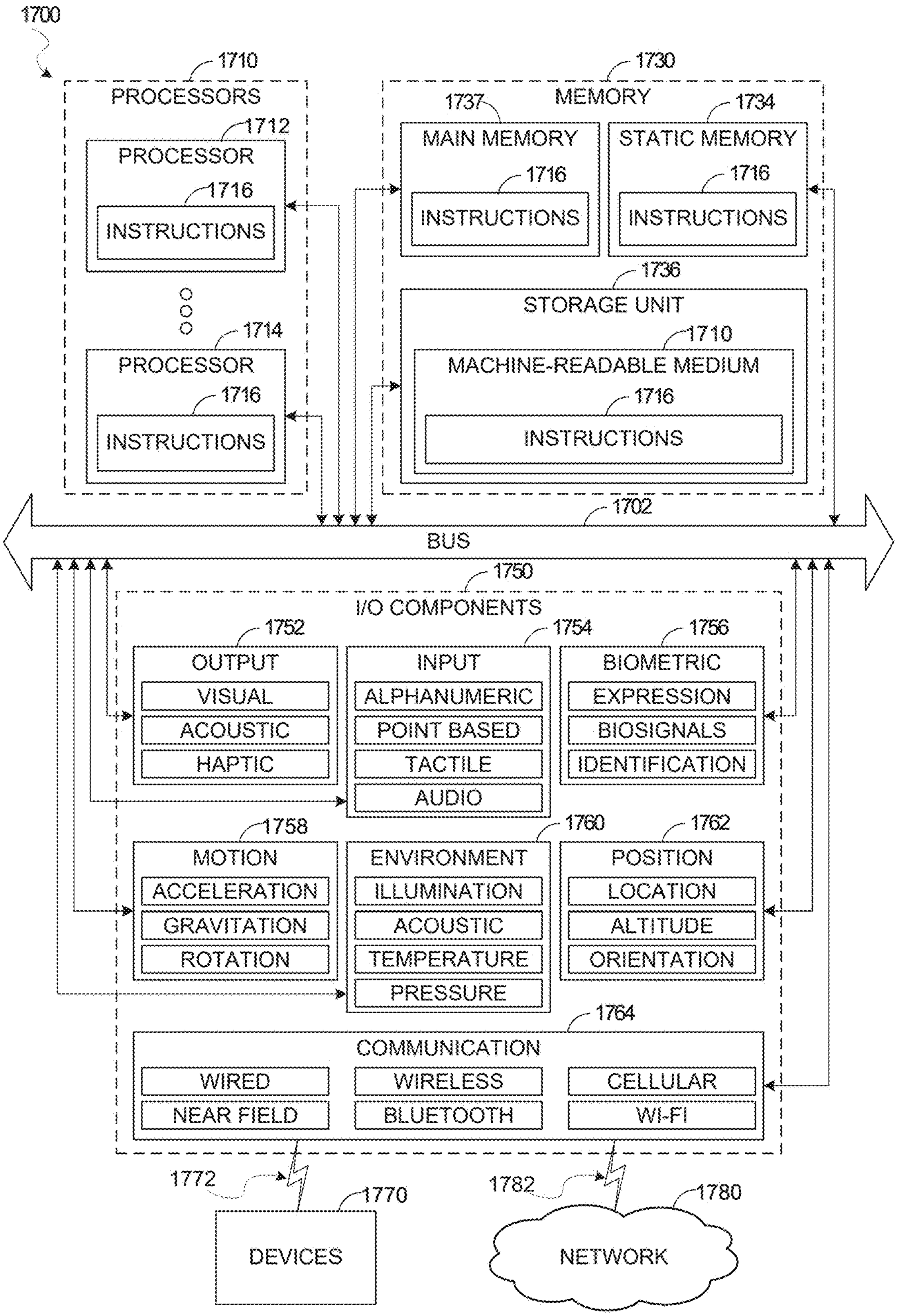
FIG. 17 illustrates a block diagram of a machine in the form of a computer system within which a set of instructions may be executed for causing the machine to perform any one or more of the methodologies discussed herein, according to an example embodiment.

FIG. 17 illustrates a diagrammatic representation of a machine 1700 in the form of a computer system within which a set of instructions may be executed for causing the machine 1700 to perform any one or more of the methodologies discussed herein, according to an example embodiment. More particularly, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. Additionally, or alternatively, the instructions 1716 may implement the functionality shown in FIGS. 2A-M. The instructions 1716 transform the general, non-programmed machine 1700 into a particular machine

1700 programmed to carry out the described and illustrated functions in the manner described. In alternative embodiments, the machine 1700 operates as a standalone device (e.g., in the form of a mobile phone and/or software in an EV) or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other such as via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1712 and a processor 1714 that may execute the instructions 1716. The term "processor" is intended to include multi-core processors that may comprise two or more independent processors (sometimes referred to as "cores") that may execute instructions 1716 contemporaneously. Although FIG. 17 shows multiple processors 1710, the machine 1700 may include a single processor 1712 with a single core, a single processor 1712 with multiple cores (e.g., a multi-core processor 1712), multiple processors 1712, 1714 with a single core, multiple processors 1712, 1714 with multiple cores, or any combination thereof.

The memory 1730 may include a main memory 1732, a static memory 1734, and a storage unit 1736, each accessible to the processors 1710 such as via the bus 1702. The main memory 1732, the static memory 1734, and the storage unit 1736 store the instructions 1716 embodying any one or more of the methodologies or functions described herein. The instructions 1716 may also reside, completely or partially, within the main memory 1732, within the static memory 1734, within the storage unit 1736, within at least one of the processors 1710 (e.g., within the processor's cache memory), or any suitable combination thereof, during execution thereof by the machine 1700.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion, and the grouping is in no way limiting. In various example embodiments, the I/O components 1750 may include output components 1752 and input components 1754. The output components 1752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762, among a wide array of other components. For example, the biometric components 1756 may include components to detect expressions (e.g., hand expressions, facial expressions, vocal expressions, body gestures, or eye tracking), identify a person (e.g., voice identification, retinal identification, facial identification, or fingerprint identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 may include a network interface component or another suitable device to interface with the network 1780. In further examples, the communication components 1764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., coupled via a USB).

Moreover, the communication components 1764 may detect identifiers or include components operable to detect identifiers. For example, the communication components 1764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as location via Internet Protocol (IP) geolocation, location via Wi-Fi® signal triangulation, location via detecting an NFC beacon signal that may indicate a particular location, and so forth.

The various memories (e.g., 1730, 1732, 1734, and/or memory of the processor(s) 1710) and/or the storage unit 1736 may store one or more sets of instructions 1716 and data structures (e.g., software) embodying or utilized by any one or more of the methodologies or functions described herein. These instructions (e.g., the instructions 1716), when executed by the processor(s) 1710, cause various operations to implement the disclosed example embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., HTTP). Similarly, the instructions 1716 may be transmitted or received using a transmission medium via the coupling 1772 (e.g., a peer-to-peer coupling) to the devices 1770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1716 for execution by the machine 1700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method for scheduling an electric vehicle (EV) charging session by an EV charger scheduling service, the computer-implemented method comprising:

causing a user interface of a software application to be presented on a display of a client computing device, the user interface presenting a plurality of time slots for scheduling the EV charging session and prompting an end-user for selection of a time slot from the plurality of time slots, each time slot associated with one or more EV chargers available during a period of time indicated by the time slot;

receiving over a network and from the software application an indication of a selected time slot for the EV charging session;

based on the selected time slot for the EV charging session, identifying a first EV charger from the one or more EV chargers available during the period of time indicated by the selected time slot;

updating a data record associated with the first EV charger to reflect that the first EV charger has been reserved for the end-user during the period of time indicated by the selected time slot;

during the period of time indicated by the selected time slot:

receiving over a network an indication from the first EV charger that an EV is connected to the first EV charger via a charge port of the EV;

in response to receiving the indication from the first EV charger that the EV is connected to the first EV charger, causing the user interface of the software application to be updated with a user interface control element, which, when selected by the end-user, causes the software application to send an instruction to the EV charger scheduling service, the instruction directing the EV charger scheduling service to activate the first EV charger to provide power to charge the EV; and in response to receiving the instruction, communicating, over a network, a first command to the first EV charger, the first command instructing the first EV charger to provide power to a connector of the first EV charger to charge the EV.

2. The computer-implemented method of claim 1, wherein identifying a first EV charger from the one or more EV chargers available during the period of time indicated by the selected time slot further comprises:

randomly selecting the first EV charger from the one or more EV chargers;

selecting the first EV charger based on a priority scheme, wherein an EV charger is selected according to a set of prioritized characteristics of the one or more EV chargers available for the selected time slot; or selecting the first EV charger based on the first EV charger having the highest number of matching EV charger characteristics with characteristics of the EV of the end-user, including both inherent characteristics of the EV and preferences explicitly set by the end-user.

3. The computer-implemented method of claim 1, wherein causing the user interface of the software application to be presented on the display of the client computing device further comprises:

displaying a selection interface that includes, for each time slot in the plurality of time slots, a selectable user interface element representing the time slot, each selectable user interface element indicating the period of time for which an EV charging session is to be reserved, wherein the period of time represented by each time slot is configurable via the EV charger scheduling service on a per location basis or on a per EV charger basis.

4. The computer-implemented method of claim 1, wherein the EV charger scheduling service is configured to enable an administrator to set a duration of a grace period on a per location basis or a per EV charger basis, the grace period representing a duration of time at the end of a scheduled charging session during which power is not provided to a connector of an EV charger, and wherein the EV charger scheduling service is further configured to communicate commencement of the grace period to the software application of the end-user.

5. The computer-implemented method of claim 1, further comprising:

sending a notification to the software application of the end-user if the EV charger scheduling service receives a status update from the first EV charger indicating the EV is disconnected from the first EV charger before the end of the period of time associated with the selected time slot, the notification prompting the end-user to confirm an early termination of the EV charging session.

6. The computer-implemented method of claim 1, wherein upon receiving an update from the first EV charger indicating a change in status due to the EV of the end-user being disconnected from the connector during an enabled charging session, causing an update to be presented via the user interface on the software application of the end-user associated with the enabled charging session, the update prompting the end-user to confirm whether the enabled charging session should be terminated; and if the end-user confirms termination, updating the data record associated with the first EV charger to reflect that the first EV charger is available for scheduling by other end-users.

7. The computer-implemented method of claim 1, wherein the EV charger scheduling service is configured to receive a location code inputted by the end-user, the location code corresponding to a private EV charger, and in response to receiving the location code, the EV charger scheduling service updates a data record associated with the private EV charger to grant access to the end-user via the software application, thereby enabling the end-user to schedule charging sessions at the private EV charger.

8. The computer-implemented method of claim 1, further comprising updating an end-user account of the end-user by adding points to a stored wallet or credit banking system within the software application when the end-user confirms, via the user interface of the software application of the client computing device, the first EV charging session has concluded prior to the end of a grace period, and wherein the software application is further configured to report a change in location of the client computing device, indicating that the EV has departed from the location of the first EV charger before conclusion of the grace period, thereby triggering an addition of points to the end-user's account as a reward for vacating a charging space in a timely manner.

9. A system for scheduling an electric vehicle (EV) charging session, the system comprising:

one or more processors;

one or more memory storage devices storing instructions thereon, which, when executed by the one or more processors, cause the system to perform operations comprising:

causing a user interface of a software application to be presented on a display of a client computing device, the user interface presenting a plurality of time slots for scheduling the EV charging session and prompting an end-user for selection of a time slot from the plurality of time slots, each time slot associated with one or more EV chargers available during a period of time indicated by the time slot;

receiving over a network and from the software application an indication of a selected time slot for the EV charging session;

based on the selected time slot for the EV charging session, identifying a first EV charger from the one or more EV chargers available during the period of time indicated by the selected time slot;

updating a data record associated with the first EV charger to reflect that the first EV charger has been reserved for the end-user during the period of time indicated by the selected time slot;

during the period of time indicated by the selected time slot:

receiving over a network an indication from the first EV charger that an EV is connected to the first EV charger via a charge port of the EV;

in response to receiving the indication from the first EV charger that the EV is connected to the first EV charger, causing a user interface of the software application to be updated with a user interface control element, which, when selected by the end-user, causes the software application to send an instruction to the system, the instruction directing the system to activate the first EV charger to provide power to charge the EV; and in response to receiving the instruction, communicating, over a network, a first command to the first EV charger, the first command instructing the first EV charger to provide power to a connector of the first EV charger to charge the EV.

10. The system of claim 9, wherein identifying a first EV charger from the one or more EV chargers available during the period of time indicated by the selected time slot further comprises:

randomly selecting the first EV charger from the one or more EV chargers;

selecting the first EV charger based on a priority scheme, wherein an EV charger is selected according to a set of prioritized characteristics of the one or more EV chargers available for the selected time slot; or selecting the first EV charger based on the first EV charger having a highest number of matching EV charger characteristics with characteristics of the EV of the end-user, including both inherent characteristics of the EV and preferences explicitly set by the end-user.

11. The system of claim 10, wherein causing the user interface of the software application to be presented on the display of the client computing device further comprises:

displaying a selection interface that includes, for each time slot in the plurality of time slots, a selectable user interface element representing the time slot, each selectable user interface element indicating the period of time for which an EV charging session is to be reserved, wherein the period of time represented by each time slot is configurable via the system on a per location basis or on a per EV charger basis.

12. The system of claim 9, wherein the EV charger scheduling service is configured to enable an administrator to set a duration of a grace period on a per location basis or a per EV charger basis, the grace period representing a duration of time at the end of a scheduled charging session during which power is not provided to a connector of an EV charger, and wherein the EV charger scheduling service is further configured to communicate the commencement of the grace period to the software application of the end-user.

13. The system of claim 9, wherein the instructions, when executed by the one or more processors, cause the system to perform operations comprising:

sending a notification to the software application of the end-user if the scheduling service receives a status update from the first EV charger indicating the EV is disconnected from the first EV charger before the end of the period of time associated with the selected time slot, the notification prompting the end-user to confirm an early termination of the EV charging session.

14. The system of claim 9, wherein the instructions, when executed by the one or more processors, cause the system to perform operations comprising:

upon receiving an update from the first EV charger indicating a change in status due to the EV of the end-user being disconnected from the connector during an enabled charging session, causing an update to be presented via a user interface on the software application of the end-user associated with the enabled session, the update prompting the end-user to confirm whether the EV charging session should be terminated; and if the end-user confirms termination, updating the data record associated with the first EV charger to reflect that the first EV charger is available for scheduling by other end-users.

15. The system of claim 9, wherein the system is configured to receive a location code inputted by the end-user, the location code corresponding to a private EV charger, and in response to receiving the location code, the system updates a data record associated with the private EV charger to grant access to the end-user via the software application, thereby enabling the end-user to schedule charging sessions at the private EV charger.

16. The system of claim 9, further comprising updating an end-user account of the end-user by adding points to a stored wallet or credit banking system within the software application when the end-user confirms, via the user interface of the software application of the client computing device, the EV charging session has concluded prior to the end of a grace period, and wherein the software application is further configured to report a change in location of the client computing device, indicating that the EV has departed from the location of the first EV charger before the conclusion of the grace period, thereby triggering an addition of points to the end-user's account as a reward for vacating a charging space in a timely manner.

17. A computer-implemented method for scheduling an electric vehicle (EV) charging session by an EV charger scheduling service, the computer-implemented method comprising:

causing a user interface of a software application to be presented on a display of a client computing device, the user interface presenting a plurality of time slots, each time slot indicating a period of time during which EV charging is available;

receiving over a network and from the software application an indication of a selected time slot for the EV charging session;

in response to detecting the selection of a time slot, presenting a user interface that displays a user interface element for each EV charger available during the period of time associated with the selected time slot, thereby enabling an end-user to view and select from the available EV chargers;

detecting selection of a specific EV charger from the presented user interface elements, each associated with an available EV charger during the selected time slot;

updating a data record associated with the selected specific EV charger to reflect that the EV charger has been reserved for the end-user during the period of time indicated by the selected time slot;

during the period of time indicated by the selected time slot:

receiving over a network an indication from the selected specific EV charger that an EV is connected to the EV charger via a charge port of the EV;

in response to receiving the indication from the selected specific EV charger that the EV is connected to the EV charger, causing the user interface of the software application to be updated with a user interface control element, which, when selected by the end-user, causes the software application to send an instruction to the EV charger scheduling service, the instruction directing the EV charger scheduling service to activate the selected specific EV charger to provide power to charge the EV; and in response to receiving the instruction, communicating, over a network, a first command to the selected specific EV charger, the first command instructing the EV charger to provide power to a connector of the EV charger to charge the EV.

18. The computer-implemented method of claim 17, wherein presenting a user interface that displays a user interface element for each EV charger available during the period of time associated with the selected time slot, further comprises:

determining the order of the user interface elements presented by:

randomly ordering the user interface elements;

ordering the user interface elements based on specific characteristics of the EV chargers; or ordering the user interface elements according to matching scores, which are determined by applying a rule-based scoring system that evaluates the extent to which characteristics of each EV charger match the desired end-user preferences and EV characteristics.

19. A system for scheduling an electric vehicle (EV) charging session, the system comprising:

one or more processors;

one or more memory storage devices storing instructions thereon, which, when executed by the one or more processors, cause the system to perform operations comprising:

causing a user interface of a software application to be presented on a display of a client computing device, the user interface presenting a plurality of time slots, each time slot indicating a period of time during which EV charging is available;

receiving over a network and from the software application an indication of a selected time slot for the EV charging session;

in response to detecting the selection of a time slot, presenting a user interface that displays a user interface element for each EV charger available during the period of time associated with the selected time slot, thereby enabling the end-user to view and select from the available EV chargers;

detecting selection of a specific EV charger from the presented user interface elements, each associated with an available EV charger during the selected time slot;

updating a data record associated with the selected specific EV charger to reflect that the EV charger has been reserved for the end-user during the period of time indicated by the selected time slot;

during the period of time indicated by the selected time slot:

receiving over a network an indication from the selected specific EV charger that an EV is connected to the EV charger via a charge port of the EV;

in response to receiving the indication from the selected specific EV charger that the EV is connected to the EV charger, causing a user interface of the software application to be updated with a user interface control element, which, when selected by the end-user, causes the software application to send an instruction to the system, the instruction directing the EV charger scheduling service to activate the selected specific EV charger to provide power to charge the EV; and in response to receiving the instruction, communicating, over a network, a first command to the selected specific EV charger, the first command instructing the EV charger to provide power to a connector of the EV charger to charge the EV.

20. The system of claim 19, wherein presenting a user interface that displays a user interface element for each EV charger available during the period of time associated with the selected time slot, further comprises:

determining the order of the user interface elements presented by:

randomly ordering the user interface elements;

ordering the user interface elements based on specific characteristics of the EV chargers; or ordering the user interface elements according to matching scores, which are determined by applying a rule-based scoring system that evaluates the extent to which characteristics of each EV charger match the desired end-user preferences and EV characteristics.

* * * * *